United States Patent
Buddha et al.

(10) Patent No.: US 11,762,754 B1
(45) Date of Patent: Sep. 19, 2023

(54) TECHNIQUES FOR DATA LOG PROCESSING, RETENTION, AND STORAGE

(71) Applicant: PayPal, Inc., San Jose, CA (US)

(72) Inventors: Deepak Buddha, Singapore (SG); Chamara Gihan De Silva Sunna Deniyage, Singapore (SG); George Chen Kaidi, Singapore (SG); Kim Dung Bui, Singapore (SG); Parag Deepak Rao, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/656,815

(22) Filed: Mar. 28, 2022

(51) Int. Cl.
   G06F 11/00 (2006.01)
   G06F 11/34 (2006.01)
   G06N 3/04 (2023.01)
   G06F 11/30 (2006.01)

(52) U.S. Cl.
   CPC ...... G06F 11/3476 (2013.01); G06F 11/3082 (2013.01); G06N 3/04 (2013.01)

(58) Field of Classification Search
   CPC ............. G06F 11/3476; G06F 11/3636; G06F 11/079; G06F 11/3409; G06F 11/3466
   See application file for complete search history.

(56) References Cited

U.S. PATENT DOCUMENTS

| | | | |
|---|---|---|---|
| 8,555,385 B1 | 10/2013 | Bhatkar et al. | |
| 8,750,288 B2 | 6/2014 | Naki et al. | |
| 9,092,332 B2 | 7/2015 | Taylor et al. | |
| 9,674,211 B2 * | 6/2017 | Curcic | H04L 63/20 |
| 9,703,675 B2 | 7/2017 | Reid, III et al. | |
| 10,795,803 B2 | 10/2020 | O'Dowd et al. | |
| 2022/0027249 A1 * | 1/2022 | Dua | G06F 11/3466 |
| 2023/0067369 A1 * | 3/2023 | Silverstein | G06F 16/1734 |

\* cited by examiner

*Primary Examiner* — Charles Ehne
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to retaining a log entry in response to detection of a respective triggering event occurring within a computer network. This triggering event may result in a set of processes being performed. A computer system may determine a trace signature for the log entry. This trace signature may track information related to the set of processes. The computer system may compute, using the trace signature, a log retention value for the log entry. This log retention value may be computed using weight factors for ones of the set of processes. The computer system may retain the log entry within a log file according to a retention period that corresponds to the log retention value.

20 Claims, 13 Drawing Sheets

Computer Network *100*

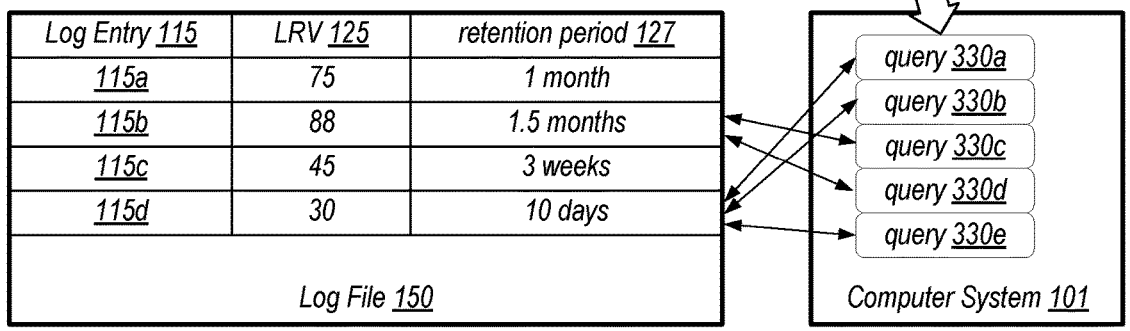
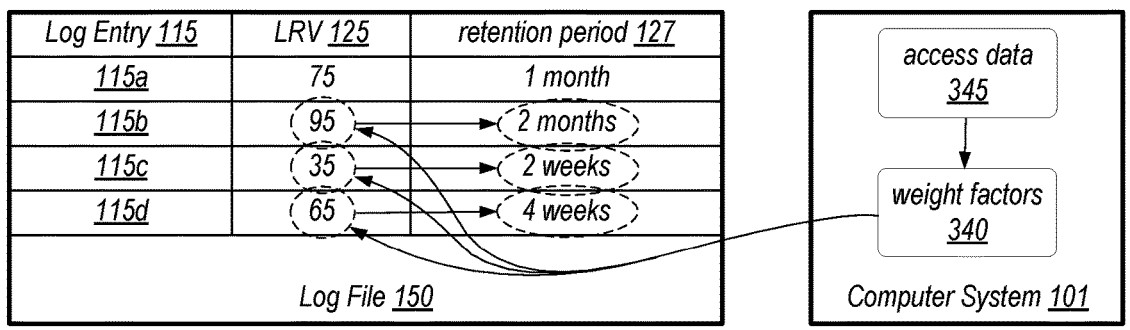
FIG. 3

900

```
┌─────────────────────────────────────────────────────────────┐
│ Modifying, by the computer system, the retention period for │
│ the log entry based on a frequency of access to the log     │
│ entry.                                                      │
│ 910                                                         │
└─────────────────────────────────────────────────────────────┘
                              │
                              ▼
┌─────────────────────────────────────────────────────────────┐
│ Modifying, by the computer system, the weight factors based │
│ on a frequency of access to the log entry.                  │
│ 920                                                         │
└─────────────────────────────────────────────────────────────┘
                              │
                              ▼
┌─────────────────────────────────────────────────────────────┐
│ Recalculating, by the computer system after modifying the   │
│ weight factors, retention periods for different log entries │
│ currently stored within the log file.                       │
│ 930                                                         │
└─────────────────────────────────────────────────────────────┘
```

FIG. 9

TECHNIQUES FOR DATA LOG PROCESSING, RETENTION, AND STORAGE

BACKGROUND

Technical Field

Embodiments described herein are related to the field of logging computer system activity, and more particularly to techniques for processing and retaining a large volume of data logs.

Description of the Related Art

Computer systems perform a multitude of actions when active and executing software. In some cases, these actions may be logged for later use, such as debugging an unexpected event, or evaluating performance for potential optimizations. These data logs may capture actions at one or more levels of activity, e.g., at a low-level tracing every processor instruction that is executed by an individual processor core, and/or at a higher-level logging various processes or applications that are launched by a server computer system for a variety of users.

Data logs may be retained and later used in response to an incident resulting in unexpected or undesired behavior of a computer system. Data logs, in some systems, may be exhaustive with a large amount of data per log, thereby resulting in limiting an amount of time these logs are retained, and/or limiting a number of data logs that are concurrently retained. In some cases, for example, only a small percentage of logs corresponding to an action that is deemed successful may be retained. Meanwhile, data logs for unsuccessful actions may be retained at a much higher rate. Such static retention rules may unnecessarily retain many unsuccessful logs while losing important successful logs that may be related to currently undiscovered issues. When incidents happen, data logs may be used to identify a pattern of actions that may lead to a cause of the incident, and corrective actions may then be taken. If, however, relevant details are missing, then patterns may not appear and/or wrong conclusions may be reached in regards to the cause of the incident. Comprehensive logs, however, may be impractical, as data log storage could run out before an adequate number of logs have been captured.

BRIEF DESCRIPTION OF THE DRAWINGS

The following detailed description makes reference to the accompanying drawings, which are now briefly described.

FIG. 3 depicts a log file at two different points in time, illustrating modification of the log file in response to user queries.

FIG. 9 depicts a flow diagram of an embodiment of a method for modifying retention periods for log entries in a log file based on a frequency of access.

DETAILED DESCRIPTION OF EMBODIMENTS

Figure 1:
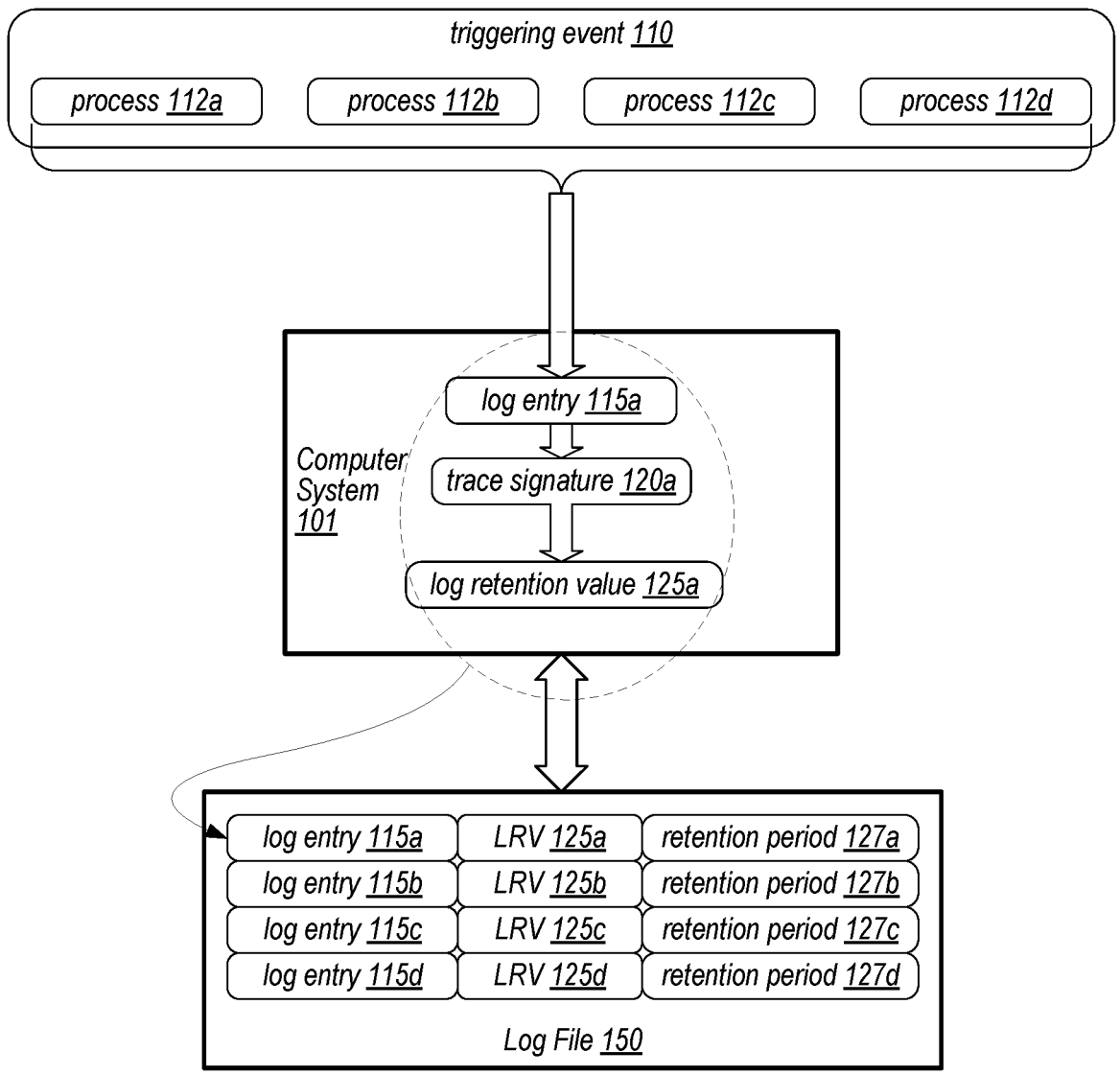
FIG. 1 illustrates a block diagram of an embodiment of a computer network for generating log entries in a log file.

Retention of data logs generated from events occurring in a computer system may present several issues. For example, in a computer network, such as one that supports an Internet-based service, one or more data logs may be generated based on actions performed by a single user. In an Internet-based service, thousands, millions, or even hundreds of millions of users may utilize such a service each day. An amount of storage capacity to retain even one day's worth of data logs may range into the petabytes, including up to hundreds of petabytes. If one month's worth of data logs are desired to be retained at a given time, then exabytes (quintillions of bytes) of storage capacity may be needed.

Accordingly, the present inventors have recognized that techniques for reducing an amount of storage used for data logging may reduce a need for maintaining exabytes of storage capacity, thereby reducing costs and technical challenges related to maintaining data log files. Several techniques are proposed that may help to capture relevant information from data logs and store these data logs in an efficient manner while reducing chances of losing valuable data. Several concepts are proposed by the inventors.

One such concept is performing a rank classification of data logs based on frequency of retrieval of similar logs. In some embodiments, a trace signature is determined for data logs based on one or more processes performed in response to a given event. A log retention index (LRI) is then mapped to the respective trace signatures based on weights assigned to each of the traced processes. These LRIs are then used to dynamically assign a retention period for ones of the logs. A feedback mechanism may be used to update usage patterns and/or weights used to determine LRIs, thereby enabling data logs including data that is currently of interest to users to be given increased priority for retention.

Another concept is determining a verbosity of ones of the data logs dynamically. Data logs are cached initially with full verbosity (e.g., all logged data included). During times when security threats are at a normal level, verbosity may be reduced for the long-term retention of data logs. In response to detection of a security threat, however, verbosity may be increased for long-term retention of logs, thereby increasing an amount of retained data at a time at which such data may be of greater interest due to the security threat. After the detected threat subsides, long-term retention of data logs may return to a normal level of verbosity.

A third concept is use of a graph convolutional network (GCN) to reduce data stored per log rather than storing a full data log. In some embodiments, one or more GCN models are generated based on existing data logs. As new data logs are received, information from the received data logs is mapped into various nodes of a selected GCN model. Mapping this information into GCN nodes may aggregate the information with other similar data logs, thereby reducing an amount of storage space required to retain the information represented by each node. In addition to reducing storage space, use of GCN models can enable link prediction between nodes of the GCN models based on the information in the data logs. Queries of subgraphs generated from these predicted links may provide further insights to recurring problems.

A fourth concept is using natural language processing (NLP) to categorize attributes in ones of the data logs. NLP highlights characteristics of received data logs that other forms of log processing may miss. For example, NLP may associate two different phrases captured in different logs that have a same connotation. The different phrases may have no significant words in common. NLP, however, recognizes a related meaning between the two different phrases, and then uses the phrases to place both logs into a common category. The data logs are assigned an initial retention period based on a predefined retention estimate. A revision of the retention period for respective data logs may be performed based on the categories associated for the respective data logs. Common sequences and patterns are then identified based on queries that match the retained data logs. These sequences and patterns may then be used to update predefined retention estimates. Such updates of the retention estimates may, in turn, enable data logs with relevant information that is currently of interest to users and subsequently be given increased priority for retention.

These proposed techniques (used individually or in various combinations) may increase an amount of data available for query through a combination of retaining data logs that may be of greater interest (e.g., captured during increased threat levels) or by aggregating or otherwise preprocessing with other logs (e.g., by use of NLP classification, and/or of GCN). Any of the disclosed techniques may include use of machine learning algorithms to increase an ability to capture information in data logs that corresponds to the types of information that will be of interest to users who rely on the data logged information, while not wasting storage space on less useful information. Such benefits may be accomplished without increasing an amount of storage capacity needed to retain the data logs. Processing of the organized data logs may further provide links between various logs that may otherwise go undetected.

A block diagram for an embodiment of a computer network is illustrated in FIG. 1. As shown, computer network 100 includes computer system 101 and log file 150. In response to triggering event 110, computer system 101 receives indications of processes 112a-112d (collectively processes 112) and generates log entry 115a. Computer system 101 may then store log entry 115a in log file 150 with a retention period 127a that is based on trace signature 120a and log retention value 125a.

As illustrated computer network 100 may be an enterprise computer system for an entity such as a business, government offices, educational institution, and the like. In the illustrated embodiment, computer network 100 includes one or more server computers that provide an Internet-based service to a variety of users. As a particular user interacts with the service, processes 112 are performed. Processes 112 may correspond to a particular action the user has initiated, such as logging into an account in computer network 100 or performing an electronic exchange with a different user of computer network 100. Such actions may cause processes 112 to be performed serially, concurrently, or a combination thereof. For example, logging into an account may launch process 112a to receive and validate credentials of the user, process 112b to perform a second factor authorization of the user, process 112c to check a status of the user's account (e.g., if there any issues with the account, if the password has expired, etc.), and process 112d to launch an initial interface for the user to navigate through their account. In various embodiments, processes 112 may correspond to larger or smaller portions of actions performed by computer network 100.

In various embodiments, computer system 101 may include a single computer system or a plurality of computer systems, such as a server farm. In some embodiments, computer system 101 may be a subset of bandwidth of a server farm leased from a third party, e.g., a virtual computer. As shown, computer system 101 generates log entry 115a in response to detection of triggering event 110. Triggering event 110, in various embodiments, may occur at a beginning of an action performed in computer network 100 (e.g., the user initiating a login operation) or at an end of the action (e.g., after process 112d completes and the user is able to interact with the interface).

Processes 112 are associated with the triggering event and performed within computer network 100. Log entry 115a may include various amounts of information related to processes 112, such as process identification values (IDs) for each of processes 112, at least a portion of information exchanged with the user by processes 112, start and/or stop times for each of processes 112, status information associated with each process (e.g., an indication that process 112b completed successfully), and the like. It is noted that sensitive information, such as user credentials, may not be included in log entry 115a or may be encrypted or otherwise obfuscated if it is included.

Computer system 101, as illustrated, may determine trace signature 120a for log entry 115a. A given trace signature may track information related to processes 112, for example, process IDs, an order in which each one of processes 112 is performed, an indication of a triggering process (e.g., process 112a may cause both process 112b and 112c to be launched concurrently), and other such information. Use of trace signatures may help to identify different triggering events that were performed in a similar manner.

As shown, computer system 101 may compute, using trace signature 120a, log retention value 125a for log entry 115a. Log retention value 125a provides an indication of how long log entry 115a is to be retained within log file 150. In some embodiments, log retention value 125a may be a value within a predefined range, such as one to ten. A value of ten may cause log entry 115a to be retained for a maximum amount of time while a value of one results in the minimum retention time. This may allow for retention times to be scaled based on current operating conditions, such as a current amount of available storage space allocated to log file 150. In other embodiments, log retention value 125a may correspond to a particular time and/or date (e.g., March 15 at 12:00 PM), or to a particular amount of time (e.g., three weeks).

In some embodiments, log retention value 125a may be computed using weight factors assigned to individual ones of processes 112. For example, processes associated with user authentication (e.g., processes 112a and 112b) may be assigned a high weight value, while processes associated with well-established tasks (e.g., initiating a user interface in process 112*d*) may be assigned lower weight values. Such weighting may result in log entries associated with account logins to be assigned longer retention times than log entries associated with user interactions with well-established tasks (e.g., returning to a main screen of an interface after completion of a different action). This weighting may allow for modification (e.g., by a system administrator) when new processes are being used. For example, if a new interface has recently been released, then weighting of process 112*d* may be increased in order to log more information associated with its usage.

After log retention value 125*a* has been determined, computer system 101 retains log entry 115*a* within log file 150 according to a retention period that corresponds to log retention value 125*a*. Log entry 115*a* is added to log file 150 which also stores log entries 115*b*-115*d*. In addition to the log entries 115*a*-115*d*, log file 150 includes respective log retention values (LRV) 125*a*-125*d* as well as the corresponding retention periods 127*a*-127*d* which indicate when each respective log entry may be removed from log file 150. In various embodiments, a background process may periodically review retention periods 127*a*-127*d* to determine if any log entry can be removed. In other embodiments, log entries 115*a*-115*d* may remain in log file 150 until a threshold minimum amount of available space has been reached, at which time a process may use retention periods 127*a*-127*d* to identify one or more log entries 115*a*-115*d* can be removed to increase the available space. Log file 150 may be stored in any suitable storage medium, including random-access memory (RAM), a hard-disk drive, a solid-state drive, optical disk storage, and the like.

If, as described above, log retention value 125*a* is a value within a given range such as one to ten, then the retention period may be set based on a current status of log file 150 and/or other factors in computer network 100. For example, if there has been a recent increase in security threats, then the retention period for the given log retention value 125*a* may be increased in comparison to what the retention period would be without the increased security threat.

Use of the described techniques for generating and retaining log entries may provide a capability to more efficiently manage a log file and increase a probability that, at a given point in time, a greater amount of relevant data has been logged as compared to traditional forms of log management. The increased flexibility may allow system administrators to adjust which types of information are prioritized for longer term storage based on current concerns with the operation of the computer network. Information related to releases of new applications or other forms of software may be prioritized for a given amount of time until developers are satisfied that the new release is operating properly. Information related to account security may be emphasized during times when account attacks are on the rise. Accordingly, use of the disclosed logging techniques may provide a more reliable and secure computer network without having to increase a storage capacity for retaining log entries.

It is noted that computer network 100 as illustrated in FIG. 1 is merely an example. FIG. 1 has been simplified to highlight features relevant to this disclosure. In other embodiments, additional elements that are not shown may be included, and/or different numbers of the illustrated elements may be included. For example, one or more computer systems may be included in the performance of each of processes 112. Although only four log entries are shown in log file 150, any suitable number of log entries may be retained at a given time.

The description of FIG. 1 discloses determination of a trace signature of a log entry. Trace signatures may be interpreted and implemented in a variety of manners. An example of how trace signatures may be determined in relation to the disclosed techniques is illustrated in FIG. 2.

Figure 2:
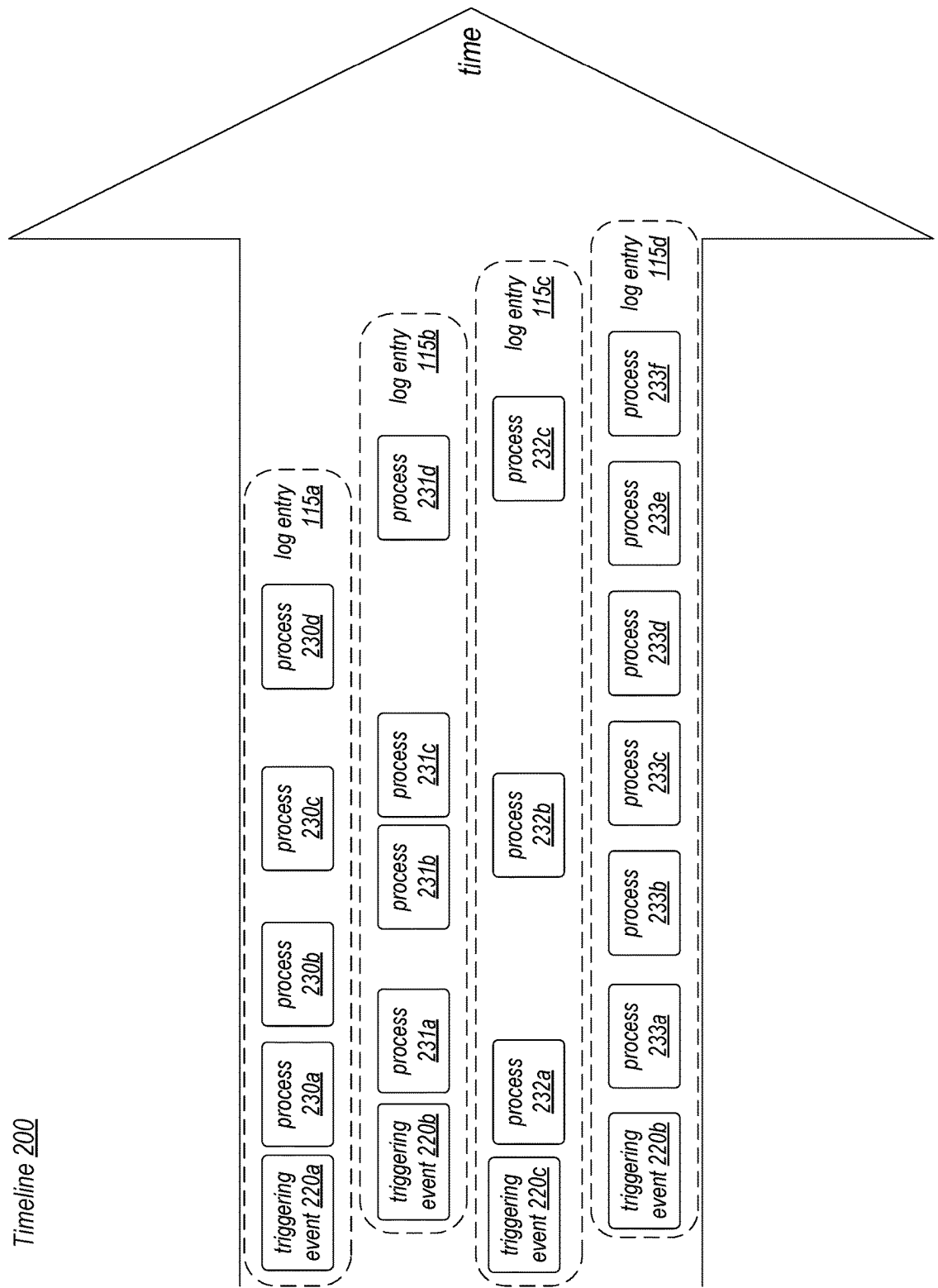
FIG. 2 shows an embodiment of a timeline depicting performance, within the computer network of FIG. 1, of various processes related to respective log entries.

Moving to FIG. 2, a diagram of an embodiment of a timeline depicting processes related to four log entries is shown. As illustrated, timeline 200 includes log entries 115*a*-115*d* (collectively log entries 115). Each of log entries 115 includes a respective triggering event 220*a*-220*d* (collectively triggering events 220) and a respective number of processes 230-233. Timeline 200 shows the occurrence of triggering events 220 and the performances of subsequent processes in a right to left progression of time.

Computer network 100 in FIG. 1 may perform various functions in response to one of triggering events 220. For example, computer network 100 may include cloud computing services offered to a plurality of subscribers, or may provide electronic exchanges between various account holders. Actions performed by users of computer network 100 may initiate respective ones of triggering events 220. Triggering event 220*a* may be similar to triggering event 110, e.g., a user logging into their account causing processes 230*a*-230*d* (collectively 230) to be performed. Process 230*a* may receive and validate credentials of the user, process 230*b* may perform a second factor authorization of the user, process 230*c* may check a status of the user's account, and process 230*d* may launch an initial interface for user navigation. As shown, process 230*d* is a last process that is associated with triggering event 220*a* and information associated with triggering event 220*a* and processes 230 are captured in log entry 115*a*.

Similarly, triggering events 220*b*-220*d* may correspond to actions taken by other users including, for example, another user logging into their account, a user launching a particular application hosted by computer network 100, a user performing an electronic exchange with another user, and the like. In some cases, one triggering event may cause two different log entries to be generated. For example, to perform an electronic exchange between two users, computer network 100 may perform a risk analysis on each of the two users to determine if there is a potential risk of fraudulent activity from either user. As illustrated, triggering event 220*b* may be a request for an electronic exchange operation between user A and user B. Processes 231*a*-231*d* (collectively 231) may be performed to determine a risk score for user A while processes 233*a*-233*f* (collectively 233) are performed to determine a risk score for user B. Processes 231*a* and 233*a* may be different instances of a same applet in computer network 100, such as an applet to access a user history for user A and user B, respectively. Based on information in each user's history, a different sequence of processes may be launched. For example, user B may have been linked to a fraud claim in the past, thereby launching additional processes to determine results of the fraud claim which may then be used in determination of a risk score for user B.

As illustrated, information related to triggering events 220*b* and 220*d* are captured in log entries 115*b* and 115*d*, respectfully. Computer system 101 subsequently determines a trace signature for each of log entries 115*b* and 115*d*, analyzing the path from the respective triggering events 220*b* and 220*d* through the performed processes 231 and 233, which differ after process 231a and 233a, resulting in different trace signatures even though they are related to a same action.

Computer system 101 may then determine respective log retention values using the respective trace signatures. The log retention value for log entry 115d may have an initial value determined by adding values assigned to each of processes 233 as well as triggering event 220b. Computing the log retention value may further include adjusting the log retention value based on an order of occurrence of processes 233. For example, processes 233b and 233c may be launched in response to user B's history retrieved by process 233a. Process 233b may be launched in response to a most recent action from user B's history while process 233c is launched at a later time based on an older action recorded in user B's history. Accordingly, a value assigned to process 233b may be weighted higher than a value assigned to process 233c. The log retention value for log entry 115 may be adjusted according to these weights. In other embodiments, all values associated with a given trace signature may be weighted before the log retention value is determined.

The log retention value for log entry 115d may be higher than the log retention value for log entry 115b due to the association with the fraud claim of user B. Based on the relationship of log entries 115b and 115d to the common triggering event 220b, the log retention value for log entry 115b may be weighted higher. If there is an interest in reviewing log entry 115d, then it may be expected that there would be an interest in the related log entry 115b.

It is noted that the embodiment of FIG. 2 is merely an example to demonstrate the disclosed concepts. Although four log entries are shown, any suitable number of log entries may be generated concurrently in other embodiments. Furthermore, the number of processes illustrated is limited for clarity. Any suitable number of processes may be included in a given log entry. For example, although log entries 115b and 115d are described as separate entries spawning from a same triggering event 220b, in other embodiments, the information may be captured in a single log entry in other embodiments.

FIG. 1 describes how a log entry may be generated and filed into a log file with a determined retention period. Retention periods may be modified after a log file is initially stored into the log file. An example of adjusting retention periods based on access data is depicted in FIG. 3.

Turning to FIG. 3, a block diagram of computer network 100 is depicted at two different points in time. Computer system 101 and log file 150 are shown at times t0 and t1. Log file 150 includes four log entries 115, each with a corresponding log retention value (LRV) 125 and retention period 127.

Prior to time t0, computer system 101 receives information associated with a triggering event that results in a set of processes being performed within computer network 100. In a similar manner as described above, log entry 115a may be generated in response to detection of the triggering event and, using the received information, a corresponding log retention value 125 (with a value of 75 as shown) is computed for log entry 115a using weight factors 340 for ones of the set of processes. Log entry 115a may then be stored in log file 150 along with other log entries 115b-115d, each log entry 115 stored according to a respective retention period 127 corresponding to a respective log retention value 125. Log file 150 is shown with log retention values 125 and retention periods based on weight factors 340 that are valid at time t0.

Between time t0 and time t1, computer system 101 receives and processes queries 330a-330e (collectively queries 330) for respective ones of users 360. Users 360, in some embodiments, are software developers who generate and/or maintain processes that are executed within computer network 100. Users 360 may generate queries 330 to retrieve information from log file 150, including from one or more of log entries 115. A given one of queries 330 (e.g., query 330a) may correspond to a request to retrieve all log entries related to a particular trigger event (e.g., a user logging into computer network 100) or to a particular one or more processes (e.g., a process used to determine risk scores). As shown, two of queries 330 (330c and 330d) result in respective accesses to log entry 115b and three queries 330 (330a, 330b, and 330e) result in respective accesses to log entry 115d. Log entries 115a and 115c are not accessed in response to queries 330.

At time t1, access data 345 is collected (e.g., by computer system 101 or another computer system in computer network 100) and includes indications of the two accesses to log entry 115b and three accesses to log entry 115d. As illustrated, computer system 101 updates weight factors 340 based on the frequency of access to log entries 115b and 115d as indicated in the collected access data 345. Accordingly, the respective retention periods 127 for log entries 115b and 115d are modified based on the frequency of access to these log entries. As shown, the log retention values for log entries 115b and 115d are increased from 88 to 95, and from 30 to 65, respectively. The corresponding retention periods 127 are also updated, from 1.5 months to 2 months for log entry 115b and from 10 days to 4 weeks for log entry 115d.

Although log entry 115c was not accessed between times t0 and t1, its log retention value 125 and corresponding retention period 127 are also modified. For example, computer system 101 may recalculate, after modifying weight factors 340, retention period 127 for log entry 115c currently stored within log file 150. As illustrated, the log retention value 125 for log entry 115c is lowered from 45 to 35 and the retention period 127 is similarly lowered from 3 weeks to 2 weeks.

It is noted, therefore, that modifications to weight factors 340 may result in an increase in log retention values for some log entries while resulting in a reduction in log retention values for other log entries. For example, an increase in accesses to particular types of trigger events and/or processes may imply less interest among users 360 in similar, but different events and processes, thereby resulting in a reduction of weight factors associated with these events and processes. Additionally, a reduction may be made to weight factors associated with events and processes that have not been accessed for a particular amount of time.

It is further noted that FIG. 3 is an example to demonstrate the disclosed concepts. Only elements needed to illustrate these concepts are shown. In other embodiments, the log file may include a different number of log entries and a different number of queries may be received and processed.

Figure 4:
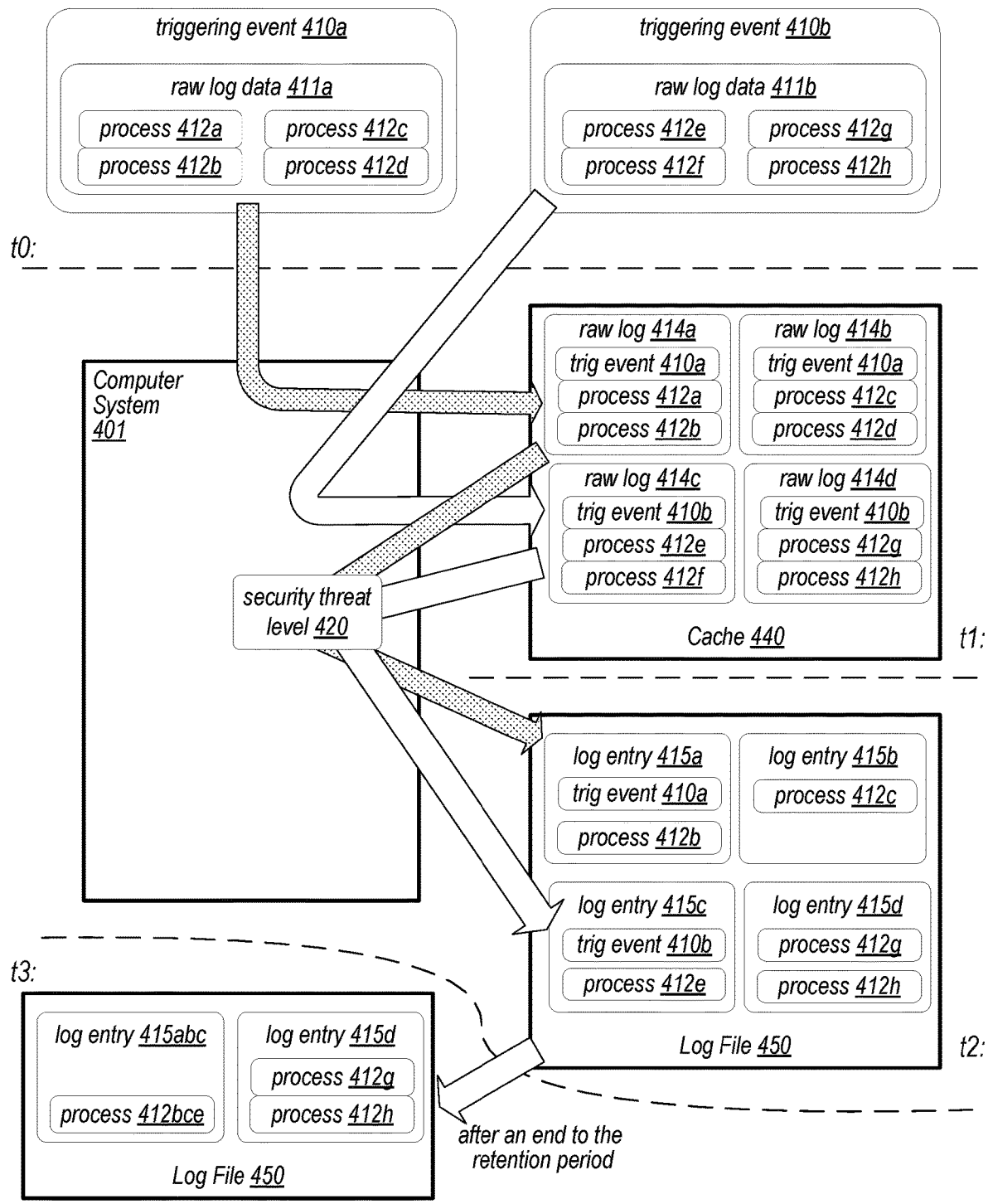
FIG. 4 illustrates a block diagram of an embodiment of a system for caching log entries before storing the entries in a log file.

FIGS. 1-3 describe a technique in which log entries are stored in a log file after being received by a computer system. In various embodiments, log files may be kept in intermediate locations prior to being stored the log file. FIG. 4 illustrates an embodiment in which log entries are cached before being stored in accordance with a determined retention period.

Proceeding to FIG. 4, a block diagram of a computer network is depicted in which a flow of log entries into a log file is depicted at several points in time. Computer network 400 includes computer system 401, cache 440, and log file 450. Two triggering events (410a and 410b) are shown, each generating respective sets of raw log data (411a-411b). Each set of raw log data 411a and 411b includes information for a respective set of processes 412 (412a-412h). Four points in time are illustrated, times t0 to t3.

As illustrated, triggering events 410a and 410b result in respective sets of processes being performed within computer network 400. Processes 412a-412d are performed in response to triggering event 410a, while processes 412e-412h are performed in response to triggering event 410b. Triggering events 410a and 410b may correspond to any type of event as described above. Triggering events 410a and 410b may or may not occur at a same point in time. Raw log data 411a and 411b may, however, be available to computer system 401 at a same point in time. In various embodiments, information captured regarding processes 412a-412d may be ready to send to computer system 401 at a same time as information regarding processes 412e-412h. In other embodiments, computer system 401 may periodically poll other computer systems in computer network 400 to retrieve available raw log data.

At time t0, computer system 401 receives raw log data 411a and 411b, including information associated with triggering events 410a and 410b as well as the information associated with processes 412. As illustrated, computer system 401 organizes raw log data 411a into two raw log entries (raw logs 414a and 414b), and raw log data 411b into two more log entries (raw logs 414c and 414d). Together, raw logs 414a and 414b include information on all processes 412a-412d, as well as the information regarding triggering event 410a. Similarly, raw logs 414 c and 414d include information on all processes 412e-412h and information on triggering event 410b. At time t1, computer system 401 caches, in cache 440, raw logs 414a-414d for a particular amount of time. These cached raw logs 414 may include a plurality of metrics associated with the triggering events 410a and 410b and associated processes 412. Cache 440, in various embodiments, may be implemented as any suitable type of memory circuit within computer system 401, or may be located externally to computer system 401, elsewhere in computer network 400. Suitable types of memory circuits may include various forms of random-access memory (RAM), hard-disk drives (HDDs), solid-state drives (SSDs), optical disk drives, and the like.

Time t2 corresponds to the end of the particular amount of time. This particular amount of time may remain constant over time or may be modified based on a current amount of storage space remaining in cache 440. For example, if available space in cache 440 falls below a threshold amount, then the particular amount of time may be shortened, or vice versa. At time t2, computer system 401 generates log entries 415a-415d (collectively 415) using the raw logs 414. As shown, a subset of the information from raw logs 414 is included in the respective log entries 415. The amount of information retained in the subset may be based on current security threat level 420. For example, computer system 401 may determine whether to reduce a number of a plurality of metrics retained with log entries 415 when storing log entries 415 to log file 450. This plurality of metrics may include the information associated with triggering events 410a and 410b and the information associated processes 412. In addition, metrics may include other information such as dates and times when raw logs 414 were generated, a value of security threat level 420 when raw logs 414 were initially cached, information regarding state of computer network 400 at times t1 an t2, and so forth.

Security threat level 420 provides an indication of a number and or severity of threats to which computer network 400 is currently susceptible. For example, if a new form of hacking attack has been detected (e.g., directly attacking computer network 400, or attacks publicized elsewhere on the Internet), then security threat level 420 may be increased from a current value. Also, if a known form of attack that could be successful against computer network 400 has increased in frequency of occurrence, then security threat level may also be increased. In contrast, if no new threats have been detected for some period of time, and detection of known attacks have decreases in number, then security threat level 420 may be decreased below the current value.

As shown, information from raw log 414a is reduced to information on triggering event 410a and on process 412b in log entry 415a. Similarly, raw log 414b is reduced to produce log entry 415b with information related to process 412c, raw log 414c is reduced to information on triggering event 410b and process 412e, and raw log 414d is reduced to information on processes 412g and 412h. For example, security threat level 420, at time t2, may indicate that only moderate security risks have been detected and, as a result, only a moderate amount of information is logged at this time.

At time t2, computer system 401 may, based on the information included in each of log entries 415, compute a respective log retention value for each of log entries 415. For example, computer system 401 may, in a manner such as described above, use weight factors for ones of processes 412 and triggering events 410 that are included in each one of log entries 415. Log entries 415 are then stored in log file 450 using the retention periods that are based on these log retention values. In some embodiments, the amount of information included in log entries 415 may be adjusted based on the log retention value. For example, a particular log entry (e.g., log entry 415b), may have information added to it if the log retention value is below a particular threshold level, thereby causing log entries 415 to meet a minimum threshold level of relevant information.

Time t3 corresponds to a point in time at which the retention periods for all four of log entries 415 have expired. In some embodiments, a given one of log entries 415 may be removed from log file 450 after its retention period expires. As shown, however, computer system 401 continues to store at least a portion of log entries 415 within log file 450. As shown, computer system 401 aggregates, at the end of the retention period, log entry 415c with log entries 415a and 415b based on determined similarities, such as having similar trace signatures. Log entries 415a-415c, as illustrated, are aggregated into a single log entry 415abc, with information related to a single process 412bce. For example, processes 412b, 412c, and 412e may correspond to a similar process (e.g., different instances of a same process) and computer system 401 may, therefore, aggregate the information for all three processes into a single process 412bce value (or set of values) that requires less space to store than the information for each of processes 412b, 412c, and 412e stored individually. Storage space, therefore, may be saved, while relevant information is preserved. In some cases, log entry 415abc may include at least a portion of metrics associated with each of log entries 415a-415c such that at least some information from each instance is preserved. Log entry 415d may be preserved as is, or in some embodiments, may be compressed using a suitable compression algorithm.

In addition, aggregated and/or compressed log entries may be stored in a different memory circuit than they were stored in at time t2.

It is further noted that computer network 400 of FIG. 4 is merely an example. Illustrated elements have been limited for clarity. In other embodiments, the raw log data may include a different amount of information, and each set of raw log data 411, and the corresponding raw logs 414 may include different amounts of data from each other.

Figure 5:
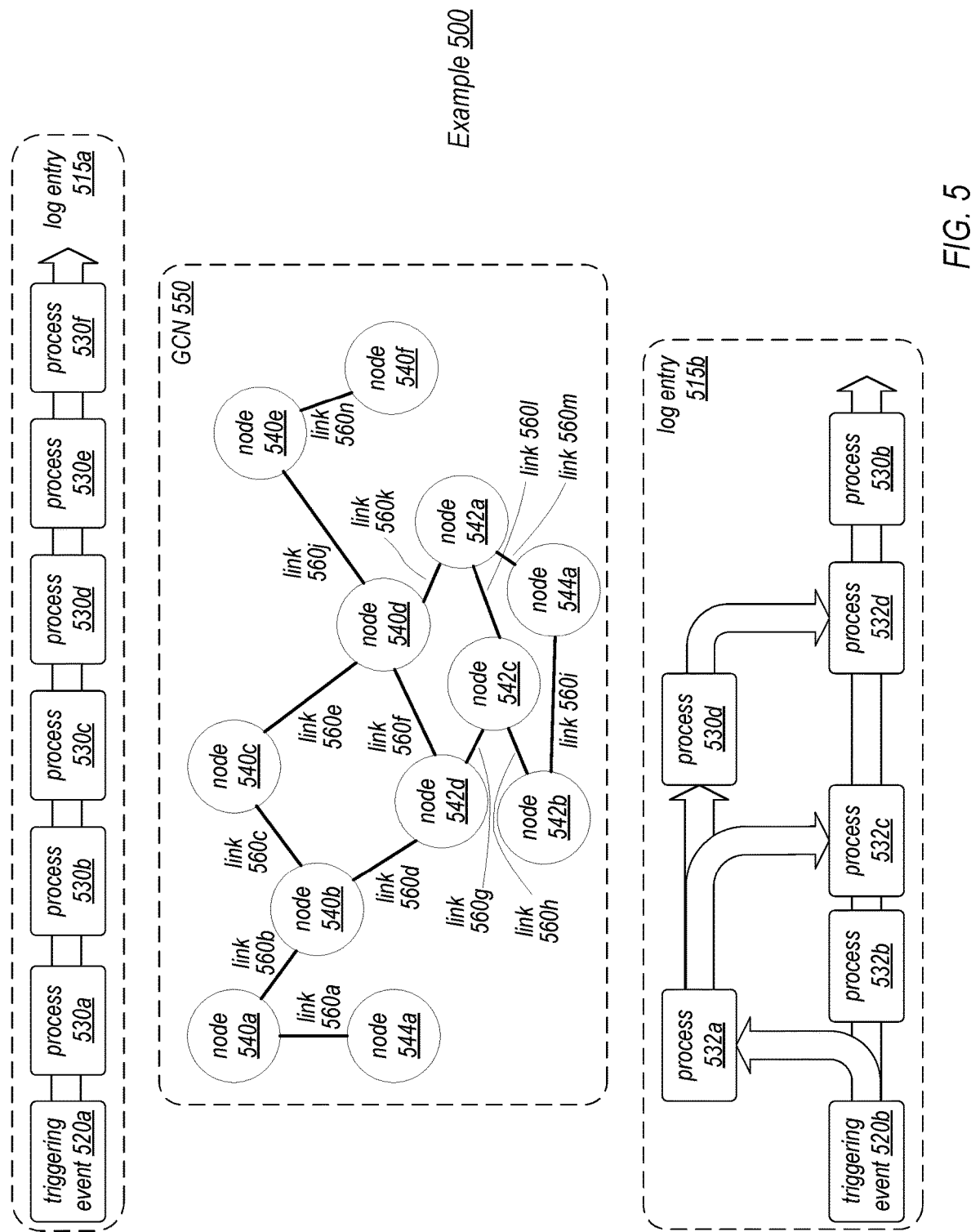
FIG. 5 shows a diagram of an example of generating nodes for a graph convolutional network (GCN) based on two log entries.

FIGS. 1-4 describe techniques in which log entries may be stored (at least initially) in a log file as individual entries. Log files may be maintained using a variety of techniques. In FIG. 5 an embodiment in which log entries are processed and stored using a graph convolution network is depicted.

Moving now to FIG. 5, an example of a graph convolutional network is shown. Example 500 depicts log entries 515a and 515b being processed (e.g., by a computer system such as computer system 101 in FIGS. 1 and 3 or computer system 401 in FIG. 4) in order to update graph convolutional network 550. Log entries 515a and 515b include information regarding respective triggering events 520a and 520b (collectively 520), as well as information regarding processes 530 and 532 that were performed in response to triggering events 520. The processing of log entries 515a and 515b may result in information being added to ones of nodes 540, 542, and 544 in graph convolutional network (GCN) 550.

As illustrated, GCN 550 includes a plurality of nodes, including the illustrated nodes 540, 542, and 544. In some embodiments, GCN 550 may include additional nodes that are not shown. Nodes 540, 542, and 544 include information related to various log entries, including log entries 515a and 515b. In some embodiments, each node may include information associated with a particular characteristic of the triggering events 520 and the processes 530 and 532. In such embodiments, a given node of GCN 550 may include information related to a plurality of processes and/or triggering events of the log entries that are processed. In other embodiments, each node may correspond to a particular process or triggering event from the log entries. For example 500, each of nodes 540, 542, and 544 corresponds to a similarly numbered one of triggering events 520, or one of processes 530 or 532. For example, node 540a corresponds to process 530a, node 544a corresponds to triggering event 520a, node 542c corresponds to process 532c, and so forth. Such a one-to-one correspondence between nodes and elements of log entries 515a and 515b may increase clarity of the disclosed concepts, but is not intended to be limiting. For example, in other embodiments, each of nodes 540 may correspond to a particular type of process, such that node 540a corresponds to processes associated with receiving data from a user, node 540b corresponds to processes associated with accessing databases, node 540c corresponds to processes associated with approving a user request, and so forth.

Links 560a-560n (collectively 560) are determined between various ones of the nodes, indicated by the straight lines between nodes. Each of links 560 indicates a relationship existing between the elements of log entries 515a and 515b. For example 500, each link 560 represents a direct transition between the triggering events and processes. As shown, link 560a connects nodes 544a and 540a because process 530a directly follows triggering event 520a. In a similar manner, links 560e and 560j indicate a flow from process 530c to process 530d and then to process 530e.

In some embodiments, log entries 515a and 515b may be aggregated by using GCN 550 to store, within nodes 540, 542, and 544, a subset of a plurality of metrics associated with log entries 515a and 515b. By mapping the relationships between elements of different log entries, some elements of the log entries may be reduced in size by not having to store complete records of these elements. In some cases, an individual element of a given log entry may be removed completely from a log file, the data logging process relying on the information captured in the GCN. In some embodiments, generating log entries may include using a GCN to map information from raw log files to nodes of the GCN. As described, links may be determined between ones of the nodes of the GCN based on the information mapped to the ones of the nodes. Rather than maintaining one or more log entries for each triggering event, the raw log data is processed into nodes and links of one or more GCNs. Such a method of logging information may use less storage space since similar processes may be mapped into a same set of nodes, thereby avoiding storage of multiple log entries that have repetitive characteristics.

Furthermore, GCNs may be used to identify sub-graphs of the GCN based on the determined links. For example, a subgraph may be identified that includes nodes 540d and 540b for their inclusion in both log entries 515a and 515b. Links 560b and 560c indicate association of process 530b with elements (processes 530a and 530c) from log entry 515a, while link 560d indicates an association with an element (process 532d) of log entry 515b. Similarly, links 560e and 560j indicate associations of process 530d with elements (processes 530c and 530e) in log entry 515a, while links 560f and 560k indicate associations with elements (processes 532d and 532a) of log entry 515b. Processes that are used across different log entries may be of interest to users of the logged information, particularly if the different log entries are associated with different types of triggering events.

It is noted that example 500 of FIG. 5 is an example for demonstrating disclosed concepts. As described, graph convolutional networks may be used to represent raw log data in a variety of manners. Example 500 is intended as one, non-limiting, example. Multiple different GCNs may be used to capture respective, different characteristics of log entries.

Figure 6:
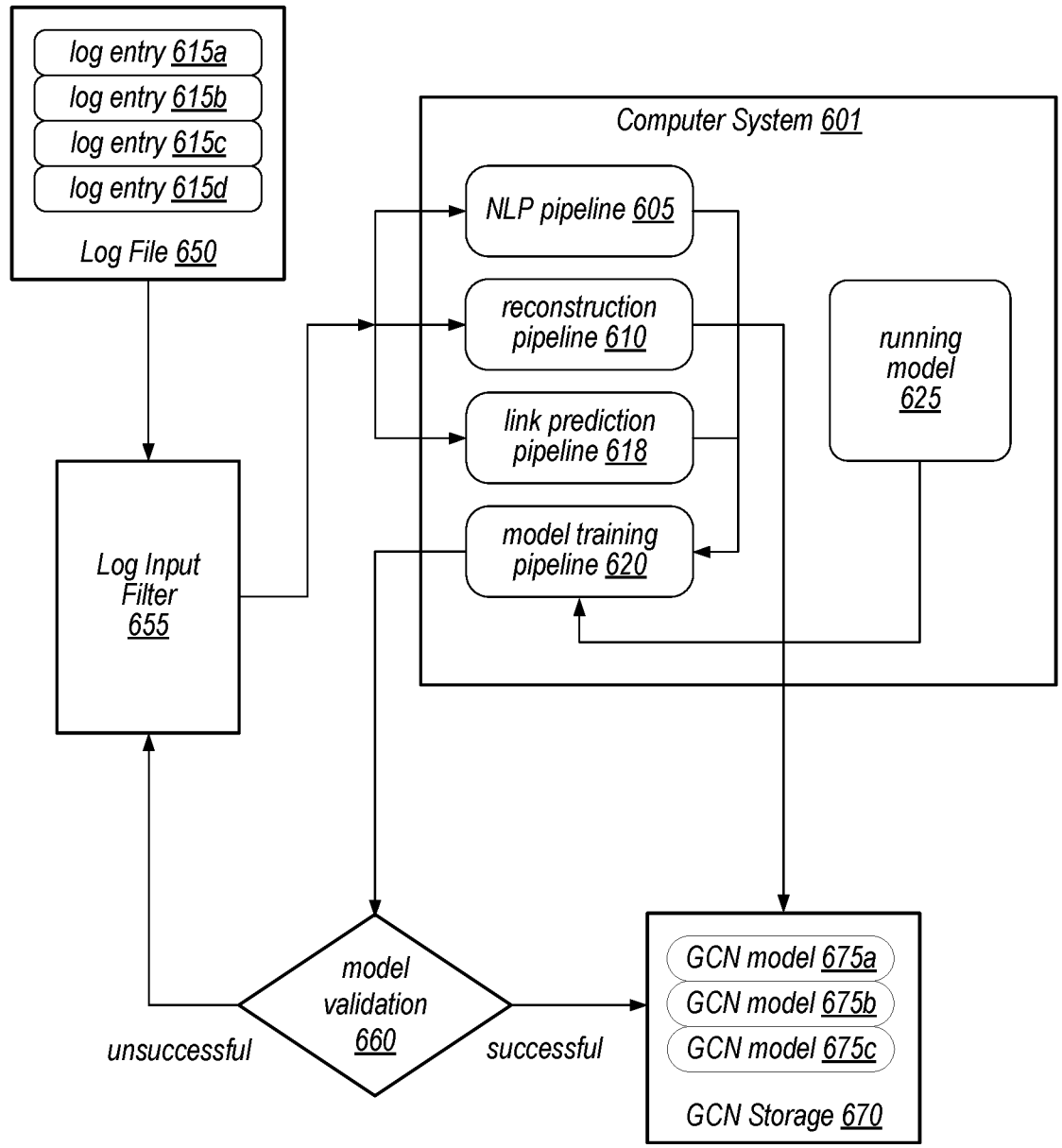
FIG. 6 depicts a diagram of an embodiment of a system for generating GCNs based on log entries in a log file.

FIG. 5 illustrates one example of a GCN used to capture information included in log entries. Various processes may be used to create one or more types of GCNs from log entries. FIG. 6 illustrates techniques for generating a plurality of GCN models within a computer network.

Turning now to FIG. 6, an embodiment of a computer network that includes a computer system that logs information using a graph convolutional network (GCN) is shown. Computer network 600 includes computer system 601 that receives log entries 615a-615d (collectively 615) from log file 650, via log input filter 655, and uses several modules (605-620) to generate, train, and use a plurality of GCN models, including GCN models 675a-675c (collectively 675). GCN models are stored in GCN storage 670. In various embodiments, any combination of log file 650, log input filter 655, and GCN storage may be implemented within computer system 601 or in a different computer system included in computer network 600.

As illustrated, computer system 601 uses one or more GCN models 675 to map information included in ones of log entries 615 to nodes of a given GCN model (e.g., GCN model 675a). Computer system 601 may determine links between ones of the nodes of GCN model 675a based on the information mapped to the ones of the nodes. Individual ones of GCN models 675 may correspond to various characteristics of the information included in log entries 615. For example, some GCN models 675 may be applicable to information in log entries associated with different aspects of security and risk, while other GCN models 675 may be applicable to information in log entries associated with usage of various applications and applets users of computer network 600 may utilize. Other ones of GCN models 675 may collect information from log entries 615 associated with respective users that caused a triggering event that created a corresponding log entry 615. For example, users' physical locations, calendar dates and times when users accessed computer network 600, information about user-to-user interactions, and the like. GCN models may be used to capture a wide variety of types of information associated with log entries 615.

In some embodiments, computer system 601 may use machine learning algorithms to generate and train ones of GCN models 675 to store data metrics related to at least a subset of log entries 615 in log file 650. In various embodiments, log entries 615 may be raw log data such as raw logs 414 in FIG. 4, or may be processed log entries such as log entries 115 and 415 in FIGS. 1 and 4, respectively. For example, one or more GCN models 675 may be used to aggregate data from a given log entry (e.g., log entry 615*a*) upon expiration of a retention period for log entry 615*a*.

To train a particular GCN model (e.g., GCN model 675*b*), GCN model 675*b* is loaded as running model 625. Log input filter 655 selects ones of log entries 615 to present to computer system 601 for inclusion in running model 625. This selection is based on characteristics associated with GCN model 675*b*. For example, GCN model 675*b* may be applicable to data metrics associated with security. Accordingly, log input filter 655 may identify ones of log entries 615 that include metrics associated with security in one form or another. After metrics from the identified log entries 615 have been incorporated into running model 625, model training pipeline 620 may be used to validate an accuracy of running model 625 to expected results. If the model validation 660 is unsuccessful, then feedback may be presented to log input filter 655, causing a different set of log entries 615 to be selected to repeat the training process on running model 625. This sequence may repeat until running model 625 has reached a threshold level of accuracy, at which point running model 625 (e.g., GCN model 675*b*) is stored in GCN storage 670. In some embodiments, individual nodes of GCN model 675*b* may be stored next to their adjacent (e.g., linked) nodes to support index-free accesses, thereby reducing access times and increasing processing speeds by eliminating or reducing a number of individual node accesses when GCN model is retrieved from GCN storage 670.

As shown, computer system 601 may utilize intelligent parsing based on natural language processing (NLP) and established rules to extract key metrics from log entries 615. NLP pipeline 605 receives information stored in a given log entry (e.g., log entry 615*a*) received from log input filter 655. Log entry 615 may include textual information captured in any suitable language supported by NLP pipeline 605. NLP pipeline may recognize words within the textual information and identify words and phrases associated with metrics applicable to particular characteristics that are to be captured by running model 625. The established rules may be used to classify the words and phrases that are identified, as well as to identify other metrics within log entry 615*a* that are not based on natural language (e.g., numbers, variables, and the like). Computer system 601 may store the identified metrics in the form of various nodes in running model 625.

In some cases, the information stored in a given node may correspond to either a "0" or "1" value indicating whether log entry 615*a* includes a characteristic represented by the given node. In other cases, more detailed information from log entry 615*a* may be included in different nodes.

After metrics in log entry 615*a* has been parsed and mapped to nodes within running model 625, computer system 601 may utilize link prediction pipeline 618 to identify links between various nodes of running model 625. In some cases, links between nodes may be very strong based on directly related metrics stored in the linked nodes. In other cases, links may be indirect, based instead on a commonality of characteristics between metrics stored in linked nodes. Such linking of nodes of running model 625 may allow the metrics from log entry 615*a* to be stored in different nodes while still retaining their connection to each other as links (also referred to as "edges") in running model 625.

Link prediction pipeline 618 may further be used to identify sub-graphs of running model 625 based on these determined links. For example, log entries 615 correspond to respective triggering events that result in processes being performed at particular points in time. Accordingly, the metrics being stored in the various nodes of GCN models 675 may also be associated with corresponding points in time. At least some of the determined links may further be associated with particular timeframes. Temporal analysis may, therefore, be used to identify sub-graphs based on metrics and links occurring, e.g., concurrently and/or sequentially. Links with similar characteristics occurring at particular times and/or dates may highlight a particular pattern that may be of interest. Such sub-graphs may be identified and stored in GCN storage 670 or other memory in computer network 600. Link prediction pipeline 618 may conduct recurring sub-graph detection on GCN models 675 to provide updated insight to data formations and patterns occurring in computer network 600.

Once trained, use of GCN models 675 may replace traditional file or table/relational storage of data logs, and further replace set-based queries. Users (e.g., developers, system administrators, etc.) may use path-based queries by utilizing the nature of the linked nodes to associated data metrics across various log entries. To mitigate data loss from raw log data to the nodes of GCN models 675, reconstruction pipeline 610 can be performed by computer system 601 in response to a received query. Reconstruction pipeline 610 may reference available GCN models 675 to probabilistically reconstruct a full data log from nodes in one or more of GCN models 675.

For example, in response to a received query that corresponds to log entry 615*d*, computer system 601 may reconstructing log entry 615*d* using reconstruction pipeline 610. The received query may include one or more operands corresponding to particular characteristics and/or metrics that are being sought. One or more GCN models 675 may be retrieved and simulated using the supplied operands. Using the validation capabilities of model training pipeline 620, a plurality of metrics may be substituted into a given one of GCN models 675 and simulated to predict metrics not included in the operands. Similar to how a blurred image may be reconstructed to a higher resolution by surveying and correlating neighboring pixels, GCN models can be simulated until a validation operation yields a successful result. The simulator may attempt to output a same set of results using the set of operands, and working backwards until an estimated log entry is created that successfully fits the running model. The simulation may re-run in a forward flow using the estimated log entry to determine if the output aligns to actual results from previous training operations. A probability index may be assigned to the estimated log entry, and then the process iterates until results are satisfactory, and/or a best fit log entry is established. This best-fit log entry may be returned as a response to the received query.

It is noted that FIG. 6 is merely an example of how a graph convolutional network may be generated, trained, and used. The illustrated elements are limited for clarity. The described operations are attributed to particular ones of the illustrated elements as an example. In other embodiments, operations may be combined into a different number of modules, including fewer or more that are illustrated.

The operations described in regards to FIG. 6 describe use of natural language processing (NLP) to identify metrics included in various log entries. NLP may be implemented using various techniques. An example technique is depicted in FIG. 7.

Figure 7:
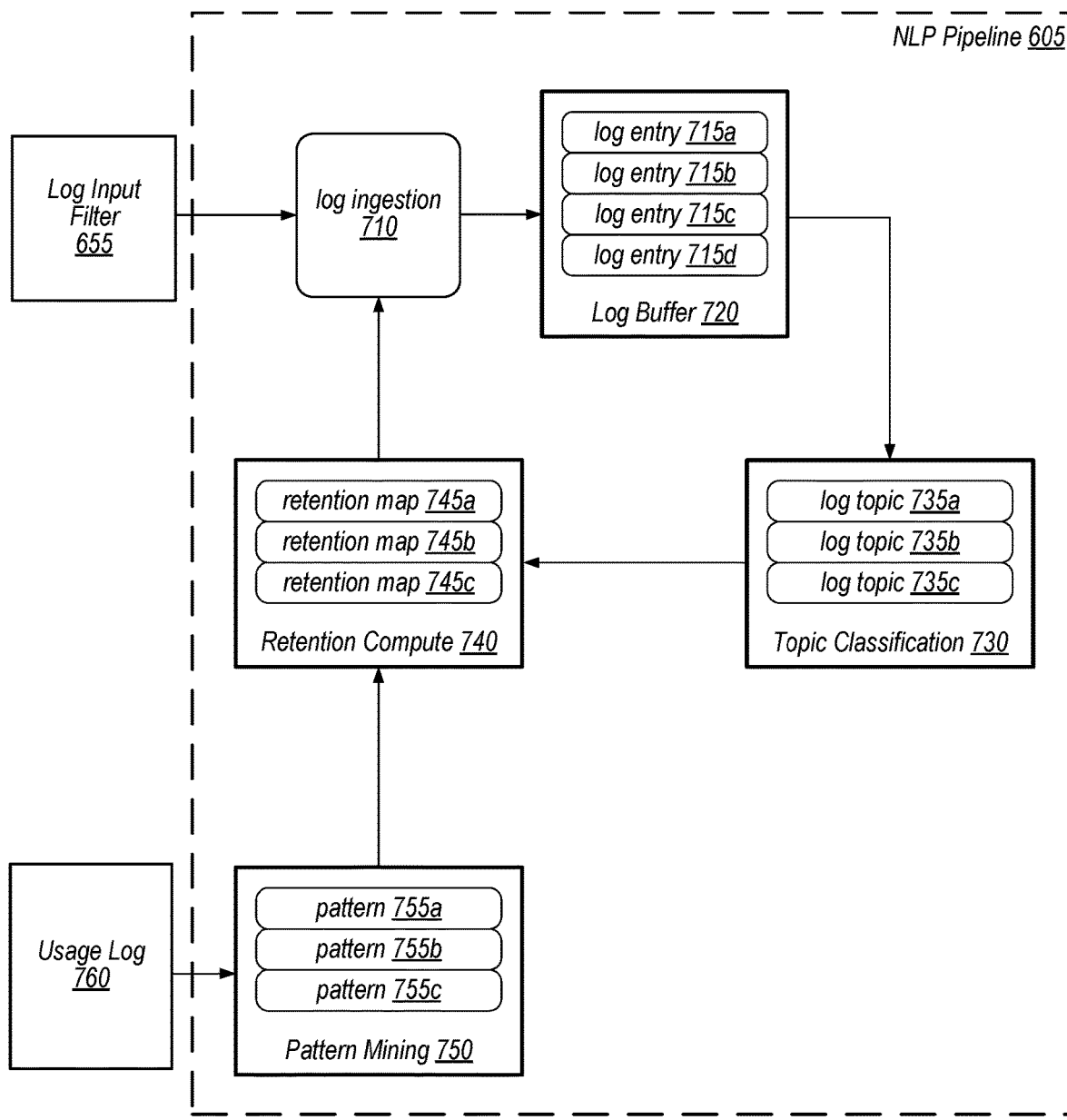
FIG. 7 illustrates a diagram of an embodiment of a system for classifying log entries and determining patterns between the classified log entries.

Proceeding now to FIG. 7, an embodiment of a block diagram of a natural language programming pipeline as implemented by a computer system (e.g., NLP pipeline 605 as implemented by computer system 601 of FIG. 6) is shown. NLP pipeline 605, as illustrated, includes a plurality of modules, such as log ingestion 710, log buffer 720, topic classification 730, retention compute 740, and pattern mining 750. Log ingestion 710 receives log entries 715*a*-715*d* (collectively 715) from log input filter 655. Pattern mining 750 receives information from usage log 760. NLP pipeline and the included modules may be implemented, in whole or in part, as software executing on computer system 601 of FIG. 6.

As depicted, NLP pipeline 605 uses natural language programming to categorize information in log entries 715 that are received by log ingestion 710 from log input filter 655 of FIG. 6. As log entries 715 are received, they are stored in log buffer 720. Initial log retention values may be determined based on existing retention maps 745*a*-745*c* (collectively 745). These retention maps 745 are generated and revised based on prior log entries that have been processed through NLP pipeline 605. Accordingly, retention maps 745 may be kept up-to-date based on information from the most recent log entries to be processed.

Natural language programming is used by NLP pipeline 605 to categorize the information included in log entries 715. For example, log entries 715 may include textual information written in a language supported by topic classification 730. Topic classification 730 may read the textual content from ones of log entries 715 and compare the read words and phrases to similar words and phrases associated with various ones of log topics 735*a*-735*c* (collectively 735). In some cases, words and phrases may be translated and/or interpreted to determine particular meanings which are then used to map the information to a particular one or more of log topics 735. By interpreting meanings of the textual content, a need to match exact words may be avoided and different words and phrases with similar connotations may be mapped to common log topics 735. The various log topics 735 may include categories based on subject matter, based on priorities or other temporal information, by Internet domains associated with the log entries 715, by other user information available in log entries 715 (e.g., geographic regions, business or educational associations, and the like).

After information included in ones of log entries 715 have been categorized, retention compute 740 may use one or more of the predefined retention maps 745*a*-745*c* (collectively 745) to revise the initial log retention values for respective log entries 715. Log retention values may be determined for an entire log entry and/or at a semantic level for the various portions of information from a given log entry 715 based on the mapped log topics 735. A given log entry (e.g., log entry 715*c*) may then have an overall log retention value plus one or more semantic log retention values based on various portions of information within log entry 715*c*. When a retention period is determined for log entry 715*c*, the overall log retention value and/or one or more of the semantic log retention values may be used to determine the retention period.

As illustrated, usage log 760 includes information regarding queries that have been received by computer system 601 for accessing log entries 715 that have already been stored, e.g., in log files 150 or 450 in FIGS. 1 and 4, respectively. Pattern mining 750 may be used by NLP pipeline 605 to review usage log 760 and identify usage patterns 755*a*-755*c* (collectively 755) based on queries from users of computer system 601 for various types of log entries 715. For example, pattern mining 750 may select a given log entry (e.g., log entry 715*d*) that has been accessed at least a threshold number of times and compare a set of processes associated with log entry 715*d* to respective sets of processes associated with different log entries 715. Based on the access patterns of other log entries with common or similar processes, pattern mining 750 may determine one or more patterns 755 based on the comparison. Pattern mining 750 and/or retention compute 740 may use one or more of patterns 755 to modify weight values associated with retention maps 745. These weight values may determine adjustments to be made when mapping ones of log entries 715 to respective one or more of retention maps 745. By updating the weighting of retention maps 745 dynamically, NLP pipeline 605 may be capable of adapting to the latest interest of the users of computer system 601.

It is noted that FIG. 7 is merely an example for describing the disclosed techniques. The operations are described as being a part of NLP pipeline 605 that is included as part of a GCN process in regards to FIG. 6. In other embodiments, some or all of the described operations may be used in logging applications that do not utilize GCNs.

The systems described above in FIGS. 1-7 may use a variety of methods for managing log entries. Several such methods for processing and storing log entries are described in FIGS. 8-13.

Figure 8:
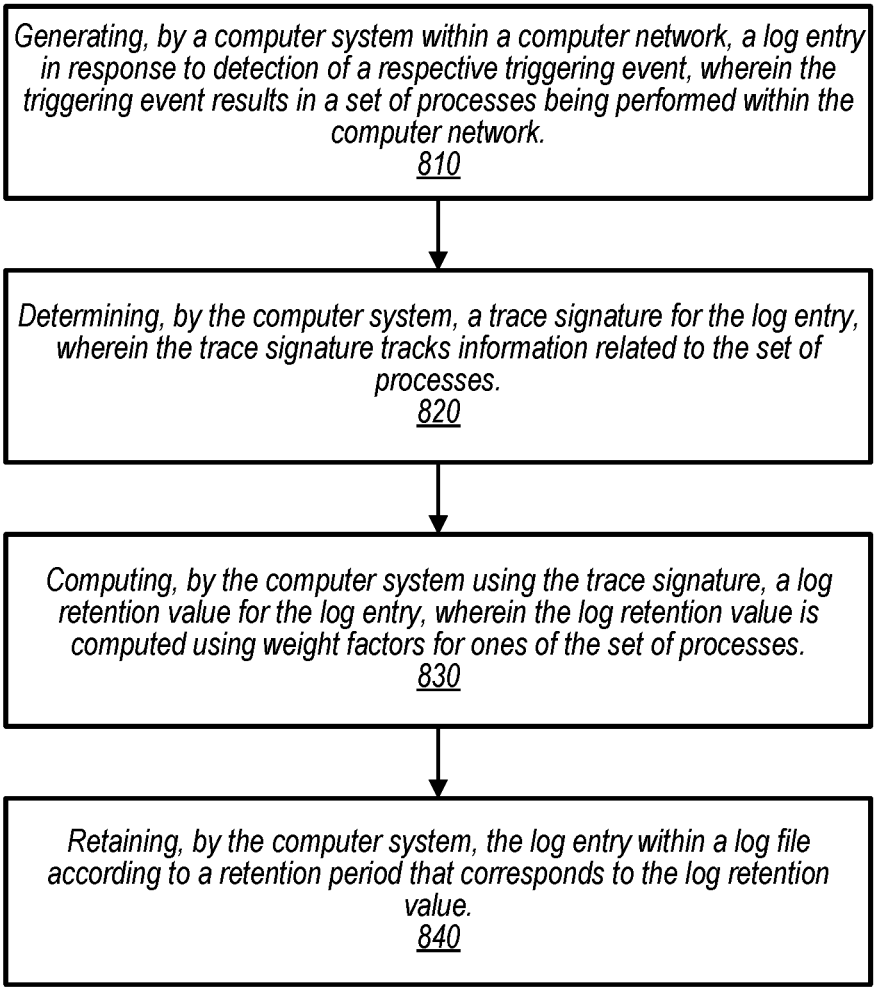
FIG. 8 shows a flow diagram of an embodiment of a method for generating log entries in a log file.

Turning now to FIG. 8, a flow diagram for an embodiment of a method for managing log entries in a log file is shown. Method 800 may be performed by a computer system such as computer systems 101, 401, and 601 in various ones of FIGS. 1-7. For example, computer system 101 may include (or have access to) a non-transient, computer-readable medium having program instructions stored thereon that are executable by computer system 101 to cause the operations described with reference to FIG. 8. Method 800 is described below using computer network 100 of FIG. 1 as an example. References to elements in FIG. 1 are included as non-limiting examples.

Method 800 begins in at 810 by generating, by a computer system within a computer network, a log entry in response to detection of a respective triggering event, wherein the triggering event results in a set of processes being performed within the computer network. For example, computer system 101 may generate log entry 115*a* in response to detecting triggering event 110. As described above, triggering event 110 may occur at a beginning or an end of an action performed in computer network 100. Processes 112 are associated with triggering event 110 and performed within computer network 100. As described above, log entry 115*a* may include various amounts of information related to processes 112, as well as triggering event 110. Any sensitive information that may be associated with processes 112, such as user credentials or other types of identifying information, may be excluded from log entry 115*a*, or may be encrypted or otherwise obfuscated if included.

At 820, method 800 continues by determining, by the computer system, a trace signature for the log entry, wherein the trace signature tracks information related to the set of processes. Computer system 101, for example, may determine trace signature 120*a* for log entry 115*a*. Trace signature 120*a* may include information related to processes 112, including e.g., tracing a path of execution from triggering event 110 through execution of each of processes 112, including indications of what triggered each process and which, if any, processes were triggered by a given process. Some or all data used as inputs or generated as outputs for each of processes 112 may also be captured in trace signature 120*a*. Trace signatures may be used to identify different triggering events that were performed in a similar manner.

Method 800 continues at 830 by computing, by the computer system using the trace signature, a log retention value for the log entry, wherein the log retention value is computed using weight factors for ones of the set of processes. For example, computer system 101 may use trace signature 120*a* to compute log retention value 125*a* for log entry 115*a*. Log retention value 125*a* may indicate a length of time for retaining long log entry 115*a* within log file 150. In some embodiments, log retention value 125*a* may be a value indicating a retention priority within a predefined range, such as zero to five. A value of zero may indicate a high retention priority, resulting in a maximum retention time. A value of five, on the other hand, may indicate a lowest priority resulting in a minimum retention time. Use of a priority ranking may allow for retention times to be scaled based on current operating conditions, such as a current amount of available storage space allocated to log file 150. In other embodiments, log retention values may correspond to a particular time and/or date (e.g., June 1 at 11:59:59 PM), or to a particular amount of time (e.g., one month).

At 840, method 800 proceeds by retaining, by the computer system, the log entry within a log file according to a retention period that corresponds to the log retention value. For example, computer system 101 stores log entry 115*a* in log file 150, along with other log entries that have previously been stored. Computer system 101 may further establish retention period 127*a* based on a value of log retention value 125*a*. In some embodiments, storing the log entry within the log file includes storing a subset of the received information in the log entry. For example, the information included in the subset may be determined based on the log retention value. For a log retention value that corresponds to a low priority log entry (e.g., a log entry with a commonly occurring trace signature), the subset of available information may be limited to, e.g., an execution path of the processes associated with the log entry. For a log retention value that corresponds to a high priority log entry (e.g., a log entry with an unusual trace signature), the subset of available information may include, in addition to the execution path, data used as inputs and outputs of the processes and times and dates of performance of each process, geographic location(s) of user(s) involved in the processes associated with the log entry, and the like.

The retention period may indicate when a respective log entry may be removed from the log file. In various embodiments, a background process may periodically review retention periods to determine if a corresponding log entry can be removed. In other embodiments, the log entries may remain in the log file until a threshold minimum amount of available space has been reached in the memory circuits where the log file is stored. When this threshold is satisfied, then a process may use the retention periods to identify one or more corresponding log entries that can be removed to increase the available space above the threshold limit.

It is noted that the method of FIG. 8 includes elements 810-840. Method 800 may end in 840 or may repeat some or all elements of the method. For example, method 800 may return to 810 to process a new log entry. In some cases, method 800 may be performed concurrently with other instances of the method. For example, multiple log entries may be processed concurrently based on various triggering events occurring throughout the computer network.

Proceeding now to FIG. 9, a flow diagram of a method for modifying weight factors used for storing log entries is illustrated. In a similar manner as method 800, method 900 may be performed by a computer system such as computer systems 101, 401, and 601 in various ones of FIGS. 1-7. The computer system may, for example, include (or have access to) a non-transient, computer-readable medium having program instructions stored thereon that are executable by the computer system to cause the operations described with reference to FIG. 9. In some embodiments, method 900 may be performed subsequent to method 800. Method 900 is described below using FIG. 3 as an example. References to elements in FIG. 3 are included as non-limiting examples.

After a log entry has been retained in a log file with a respective log retention value, method 900 begins at 910 by modifying the retention period for the log entry based on a frequency of access to the log entry. Referring to FIG. 3, for example, access data 345 may be collected, including indications of two accesses to log entry 115*b* and three accesses to log entry 115*d*. Since these accesses to log entries 115*b* and 115*d* may be indicative of interest, by users 360, of the information included in these log entries, the respective retention periods 127 for log entries 115*b* and 115*d* may be increased so that the information in these log entries remains available for a longer amount of time.

At 920, method 900 continues by modifying the weight factors based on a frequency of access to the log entry. For example, weight factors 340 may be used when determining log retention values such as described above for method 800. These weight factors may include indications of types of information that are being queried by users 360, and therefore, the types of information that may be worth preserving in log file 150. Accordingly, weight factors 340 may be updated based on the collected access data 345. In some embodiments, weight factors associated with types of information that have been accessed frequently may be given more weight, while weight factors associated with types of information that are not being accessed often may be reduced to give these factors less weight.

Method 900 may proceed to 930 by recalculating, after the modifying of the weight factors, retention periods for different log entries currently stored within the log file. As shown in FIG. 3, for example, a log retention value 125 and corresponding retention period 127 are modified for log entry 115*a* even though it was not accessed during the time when access data 345 is collected. After weight factors 340 have been modified, retention periods 127 may be recalculated for other log entries 115 currently stored within log file 150. Based on the modified weight factors 340, the log retention value 125 for log entry 115*c* is lowered from 45 to 35 and the retention period 127 is similarly lowered from 3 weeks to 2 weeks.

It is noted that method 900 includes elements 910-930. Method 900 may end in 930 or may repeat some or all elements of the method. For example, method 900 may repeat 930 to process some or all log entries in the log file. Method 900 may be performed concurrently with other instances of the method. For example, multiple sets of access data may be generated and processed concurrently based on various queries submitted by users of the computer network.

Figure 10:
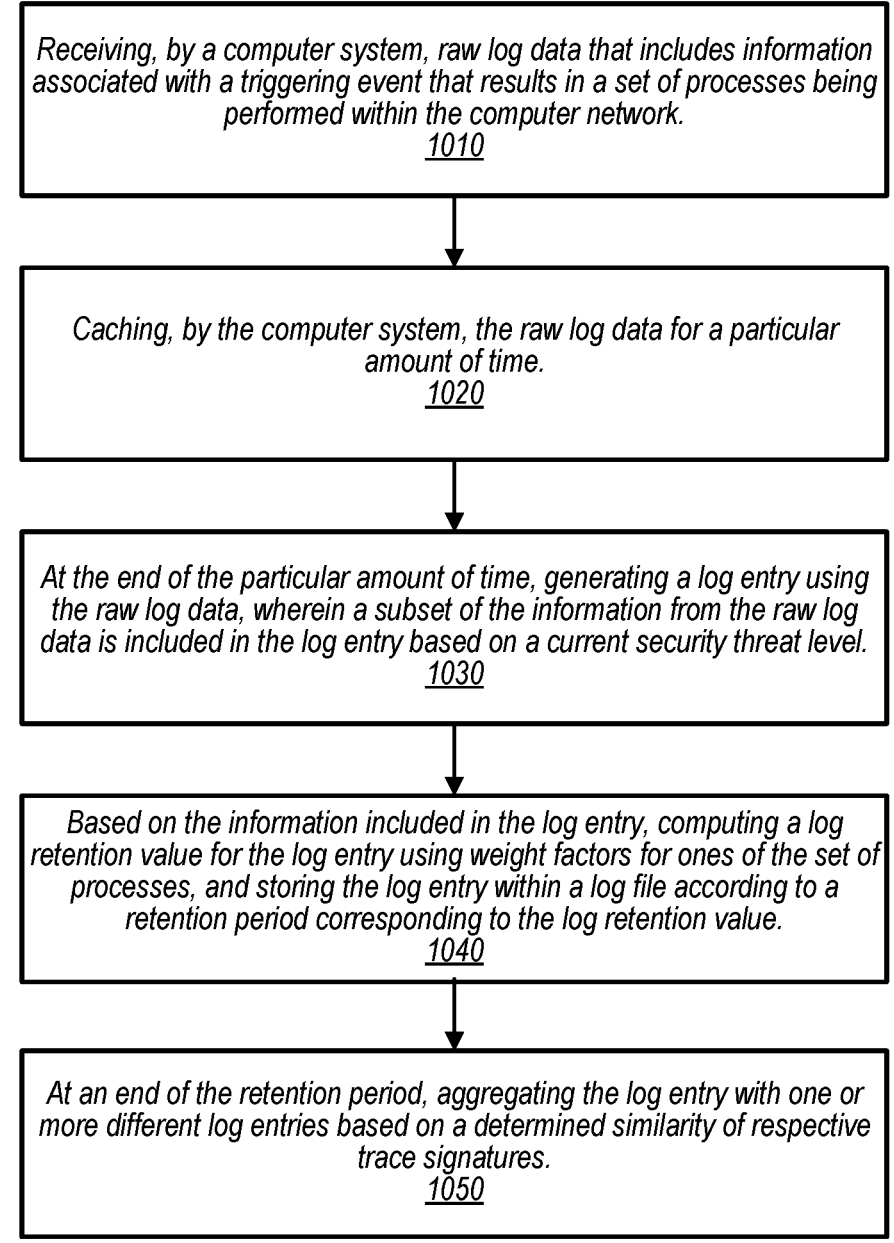
FIG. 10 illustrates a flow diagram of an embodiment of a method for caching log entries before retaining the cached log entries in a log file.

Moving to FIG. 10, a flow diagram of a method for caching log data prior to generating a log entry is illustrated. Similar to methods 800 and 900, method 1000 may be performed by a computer system such as computer systems 101, 401, and 601 in various ones of FIGS. 1-7. FIG. 4 is used in the description below as an example for performing method 1000. References to elements in FIG. 4 are included as non-limiting examples.

Method 1000 begins at 1010 by receiving raw log data that includes information associated with a triggering event that results in a set of processes being performed within a computer network. For example, computer system 401 receives raw log data 411*a*, including information associated with triggering event 410*a* as well as the information associated with processes 412*a*-412*d*. As illustrated, computer system 401 organizes raw log data 411*a* into raw logs 414*a* and 414*b*. Together, raw logs 414*a* and 414*b* include information on all processes 412*a*-412*d*, as well as the information regarding triggering event 410*a*.

At 1020, method 1000 proceeds by caching the raw log data for a particular amount of time. For example, after being created, raw logs 414*a* and 414*b* are stored in cache 440 for the particular amount of time. These cached raw logs may include a plurality of metrics associated with the triggering event 410*a* and associated processes 412*a*-412*d*. This particular amount of time may remain constant over time or may be increased or decreased based on a current amount of storage space remaining in cache 440. For example, if available space in cache 440 is above a threshold amount, then the particular amount of time may be increased, thereby making the plurality of metrics available for queries for a longer amount of time.

At the end of the particular amount of time, method 1000 continues at 1030 by generating a log entry using the raw log data, wherein a subset of the information from the raw log data is included in the log entry based on a current security threat level. As shown in FIG. 4, for example, log entries 415*a* and 415*b* may be generated from raw logs 414*a* and 414*b*, respectively. A subset of the information from raw logs 414*a* and 414*b* is included in the respective log entries 415*a* and 415*b*. The amount of information retained in the subset may be based on current security threat level 420. As previously described, security threat level 420 may provide an indication of a number and or severity of threats to which computer network 400 is currently susceptible. The amount of information retained may be based, at least in part, by how relevant the information in raw logs 414*a* and 414*b* is to security of computer network 400.

Based on the information included in the log entry, method 1000 proceeds by computing a log retention value for the log entry using weight factors for ones of the set of processes, and storing the log entry within a log file according to a retention period corresponding to the log retention value. For example, as described above, log retention values may be computed for log entries 415*a* and 415*b* using weight factors for the information that remains in each one of log entries 415*a* and 415*b*. Log entries 415*a* and 415*b* are then stored in log file 450 using retention periods that are based on these computed log retention values.

At an end of the retention period, method 1000 continues at 1050 by aggregating the log entry with one or more different log entries based on a determined similarity of respective trace signatures. In some embodiments, a given log entry may be removed from log file 450 after its retention period expires. In the example shown in FIG. 4, however, at least a portion of log entries 415 may continue to be stored within log file 450. Some information from each of log entries 415*a*-415*c* is aggregated, based on determined similarities, at the end of the retention period. Log entries 415*a*-415*c* may, for example, have similar trace signatures. Log entries 415*a*-415*c*, as illustrated, are aggregated into a single log entry 415*abc*, with information related to a single process 412*bce*. For example, processes 412*b*, 412*c*, and 412*e* may be, e.g., different processes performing a similar task. Aggregating the information for all three processes into a single process 412*bce* may reduce an amount of storage space used in log file 450 while retaining relevant information in the log file.

It is noted that method 1000 includes elements 1010-1050. Method 1000 may end in 1050 or may repeat some or all elements of the method. For example, method 1000 may return to 1030 to generate a next log entry at an end of the particular amount of time for a raw log that was cached after raw logs 414*a* and 414*b*. Method 1000 may be performed concurrently with other instances of the method. For example, an instance of method 1000 may be performed every time raw log data is received.

Figure 11:
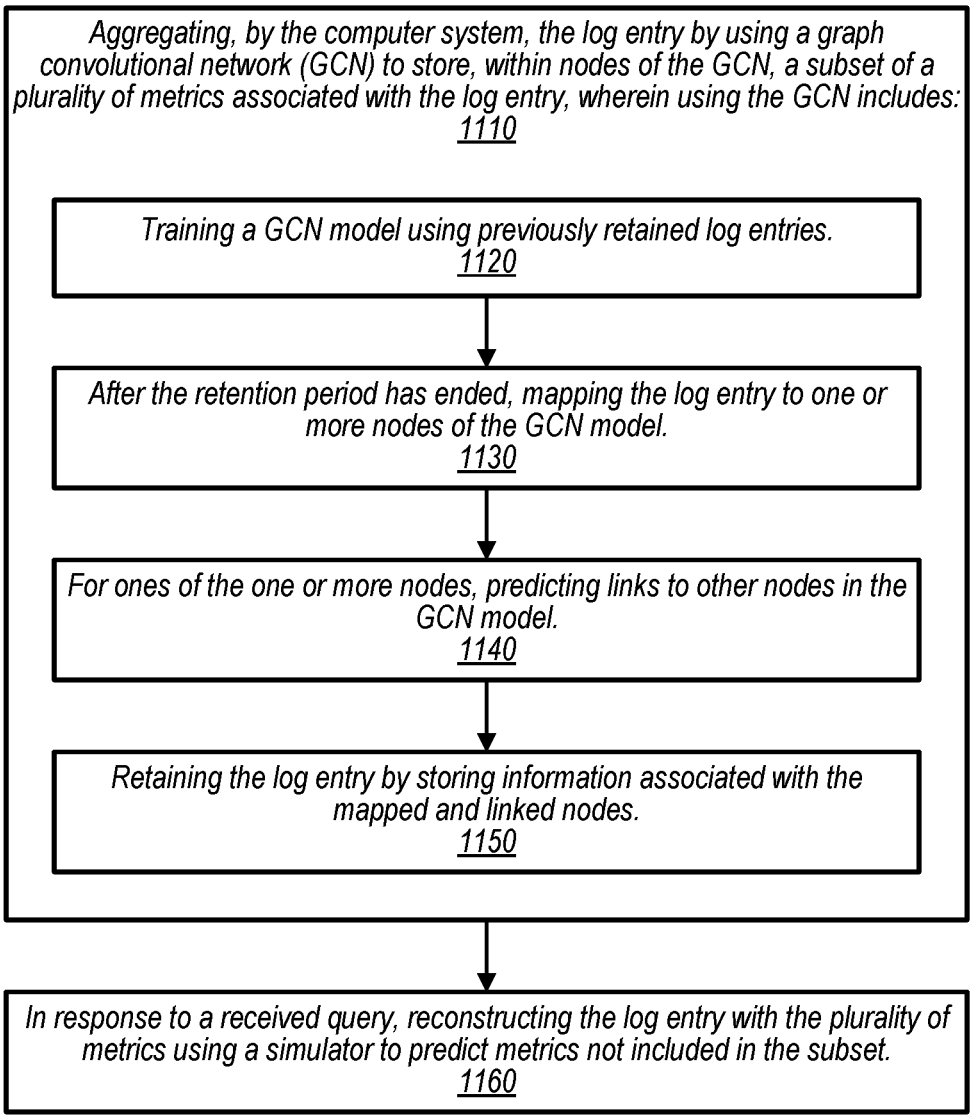
FIG. 11 shows a flow diagram of an embodiment of a method for generating GCN models based on log entries in a log file.

Turning to FIG. 11, a flow diagram of a method for using a graph convolutional network to store information from log entries is depicted. Similar to the other disclosed methods, method 1100 may be performed via a computer system such as computer systems 101, 401, and 601 in various ones of FIGS. 1-7. In some embodiments, method 1100, or portions thereof, may correspond to actions performed during element 1050 of method 1000. FIG. 6 is used in the description below as an example for performing method 1100. References to elements in FIG. 6 are included as non-limiting examples.

As illustrated, method 1100 begins after a retention period for a log entry currently stored in a log file has expired. Method 1100 begins at 1110 by aggregating the log entry by using a graph convolutional network (GCN) to store, within nodes of the GCN, a subset of a plurality of metrics associated with the log entry. Element 1110 includes a plurality of sub-blocks that may be performed as a part of the aggregating.

Performing the aggregating includes, at 1120, training a GCN model using previously retained log entries. Referring to FIG. 6, for example, training a particular GCN model (e.g., GCN model 675*a*), may include loading GCN model 675*a* is as running model 625. Before training, GCN model 675*a* may include a default set of rules for creating nodes based on input metrics from log entries. Log input filter 655 may select ones of log entries stored in log file 650 for use in training running model 625. This selection may be based on particular characteristics associated with GCN model 675*a*. For example, GCN model 675*a* may be applicable to data metrics associated with security. Accordingly, log input filter 655 may identify log entries that include metrics associated with security in one form or another, and these metrics are then mapped to existing nodes of GCN model 675*a* or new nodes may be created if a given metric does not correspond to an existing node. After metrics from various log entries have been mapped into running model 625, model training pipeline 620 may be used to validate an accuracy of running model 625. Based on the validation, running model 625 may be modified, e.g., some metrics may be remapped, some nodes may be separated into a plurality of nodes, and/or some nodes may be merged into a single node. This sequence may repeat until running model 625 has reached a threshold level of accuracy, at which point running model 625 (e.g., GCN model 675*a*) is stored in GCN storage 670.

Performing the aggregating further includes, at 1130, mapping the log entry to one or more nodes of the GCN model after the retention period has ended. For example, log input filter 655 may send log entry 615*b* to computer system 601 after a retention period for log entry 615*b* expires. Computer system 601 may make select a particular GCN model (e.g., GCN model 675*a*) as running model 625 for the aggregation of log entry 615*b*. Using NLP pipeline 605, computer system 601 may identify one or more metrics included in log entry 615*b* and then use these identified metrics to select GCN model 675*a* of GCN models 675 as a best fit for the identified metrics. The identified metrics may then be mapped to one or more nodes of running model 625.

As shown at 1140, performing the aggregating further includes, for ones of the one or more nodes, predicting links to other nodes in the GCN model. Computer system 601, for example, may use link prediction pipeline 618 to identify links between ones of the nodes of running model 625. In some cases, links between nodes may be very strong based on directly related metrics stored in the linked nodes. A same metric mapped to two or more nodes may, e.g., demonstrate a strong link between these nodes. Links may also be indirect, based on similar characteristics between metrics stored in linked nodes. Two nodes may include respective metrics that are indicative of two processes that are frequently, but not always, performed sequentially and/or concurrently. These two nodes may be linked to indicate this common occurrence.

At 1150, performing the aggregating also includes retaining the log entry by storing information associated with the mapped and linked nodes. For example, computer system 601 may, after mapping the metrics of log entry 615*b* to the nodes of running model 625, log entry 615*b* may be removed from log file 650, thereby making room for future new log entries. The nodes and links incorporated into GCN model 675*a* based on the metrics of log entry 615*b* may retain relevant portions of log entry 615*b* in an efficient manner, using less storage space than maintaining the individual log entry 615*b*.

Method 1100 continues at 1160 by, in response to a received query, reconstructing the log entry with the plurality of metrics using a simulator to predict metrics not included in the subset. Log entry 615*b*, for example, may be reconstructed using reconstruction pipeline 610. Computer system 601 may use reconstruction pipeline 610 to select a particular one of GCN models 675 and, based on information included in the nodes of the selected model and information provided in the query, an estimation of log entry 615*b* may be reconstructed without a need for storing all metrics originally included in log entry 615*b*. Additional details of the reconstruction process are provided below in reference to method 1200.

Method 1100, it is noted, includes elements 1110-1160. As described for the other methods disclosed herein, method 1100 may end in 1160 or may repeat some or all elements. For example, method 1100 may repeat element 1160 for a plurality of received queries. In some embodiments, the training in element 1120 may not be performed for every iteration of element 1110. In addition, method 1100 may be performed concurrently with other instances of the method. For example, multiple instances of method 1100 may be performed concurrently for training different GCN models and then aggregating log entries into the different models.

Figure 12:
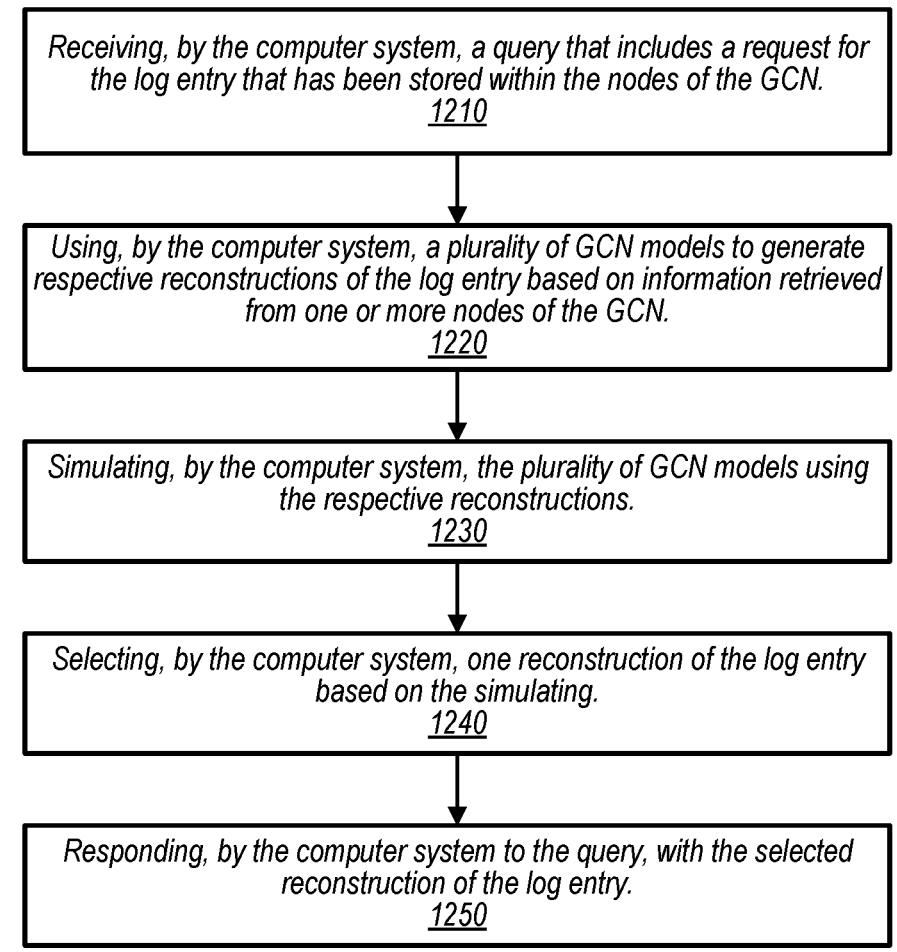
FIG. 12 depicts a flow diagram of an embodiment of a method for reconstructing a log file retained within a GCN model.

Turning to FIG. 12, a flow diagram of a method for reconstructing a log entry using a graph convolutional network is depicted. Method 1200, as described for other disclosed methods, may be performed via a computer system such as computer systems 101, 401, and 601 in various ones of FIGS. 1-7. Method 1200, in some embodiments, may correspond to actions performed during element 1160 of method 1100. In the following description, FIG. 6 is used as an example for performing method 1200. References to elements in FIG. 6 are included as non-limiting examples.

Method 1200 begins at 1210 by receiving a query that includes a request for a log entry that has been stored within nodes of a graph convolutional network (GCN). Referring to FIG. 6, for example, the received query may include one or more operands corresponding to particular characteristics and/or metrics that are being sought after by the query. A user of computer system 601 may, e.g., submit a query to retrieve a log entry related to a particular client logging into their respective account on a particular day. Client information, the action of logging into an account, and the date of the particular day may be used as operands to be used for reconstructing the log entry.

At 1220, method 1200 continues by using a plurality of GCN models to generate respective reconstructions of the log entry based on information retrieved from one or more nodes of the GCN. For example, one or more GCN models 675 may be retrieved and simulated using the received operands. Computer system 601 may select ones of GCN models that are associated with metrics that may typically be related to account login operations. These models may be loaded, one at a time for instance, as running model 625. The operands may then be substituted into running model 625 to generate a reconstructed log entry. This may be repeated for multiple different GCN models 675, and/or repeated for a single GCN model 675 with different sets of inputs. A plurality of reconstructed entries may, therefore, be generated.

Method 1200 proceeds to 1230 by simulating the plurality of GCN models using the respective reconstructions. For example, computer system 601 may, using the validation capabilities of model training pipeline 620, perform simulate the plurality of reconstructed entries to determine if the reconstructed entries fit the model. Each reconstructed entry may be substituted into a given one or more of GCN models 675 and then simulated in reverse to predict the metrics that are missing from the operands. The GCN models may be simulated with different sets of metric inputs until a validation operation successfully fits the running model. One or more successfully reconstructed entries may be generated from the reverse simulations.

At 1240, method 1200 continues by selecting one reconstruction of the log entry based on the simulating. After simulating the reconstructed log entries, simulation may be repeated, for example, in a forward flow using a complete reconstructed log entry to determine if the output aligns to actual results from previous training operations. A probability index may be assigned to each reconstructed log entry. In some embodiments, a single reconstructed log entry may be selected based on the probability index. In other embodiments, a plurality of most probable reconstructed log entries may be selected.

Method 1200 continues to 1250 by responding, by the computer system to the query, with the selected reconstruction of the log entry. For example, the reconstructed log entry with the highest probability index (e.g., the most likely match) may be returned to the user who submitted the query. In other embodiments, a plurality of best matches may be returned. Method 1200 may end in 1250.

It is noted that method 1200 includes elements 1210-1250. As described for the other disclosed methods, method 1200 may end in 1250 or may repeat some or all elements. For example, elements 1220 and 1230 may repeat for given ones of the reconstructed log entries until simulations produce valid results. After each iteration, missing metrics may be replaced with various different estimates and simulations repeated. Additionally, method 1200 may be performed concurrently with other instances of the method. For example, multiple instances of method 1200 may be performed concurrently to simulate a given reconstructed log entry using different GCN models for each simulation, thereby reducing an amount of time to produce the desired results.

Figure 13:
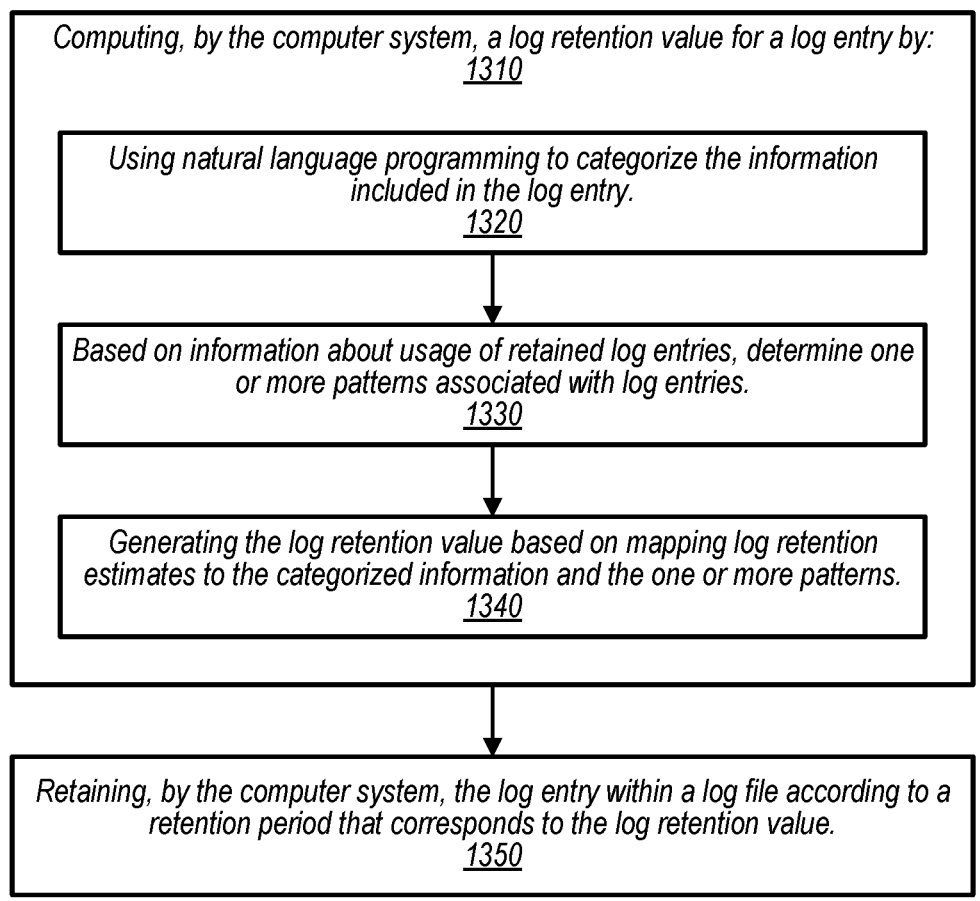
FIG. 13 illustrates a flow diagram of an embodiment of a method for using natural language programming to classify and retain log entries.

Turning to FIG. 13, a flow diagram of a method for computing a log retention value is shown. As described for the methods above, method 1300 may be performed via a computer system such as computer systems 101, 401, and 601 in various ones of FIGS. 1-7. Method 1300, in some embodiments, may correspond to actions performed during element 830 of method 800. In the proceeding description, FIG. 7 is used as an example for performing method 1300. References to elements in FIG. 7 are included as non-limiting examples.

Method 1300 begins at 1310 by computing a log retention value for a log entry. As shown, computing the log retention value may include a plurality of operations. To begin, for example, a computer system may determine a trace signature for the log entry, in a manner as described above. The trace signature, as previously described, may include information related to a triggering event and subsequent processes that are performed, including indications of what triggered each process and which, if any, processes were triggered by a given process. Some or all data used as inputs or generated as outputs for each of the processes may also be captured in the trace signature.

Computing the log retention value may also include, at 1320, using natural language programming to categorize the information included in the log entry. For example, the log entry may include textual information written in a supported language. In some embodiments, the textual content may be read from the trace signature, and compared to similar words and phrases associated with various ones of a plurality of topics. Meanings of the textual content may be interpreted, reducing a need to match exact words and phrases. The interpreted meanings may then be mapped to corresponding ones of the plurality of topics. The plurality of topics may include categories based on subject matter, priorities, temporal information, user information, and so forth.

At 1330, computing the log retention value further includes determining one or more patterns associated with log entries based on information about usage of retained log entries. As previously described, access information may be tracked by the computer system and stored in a usage log. For example, a number of times that a given log entry is accessed as a result of a query may be logged in to the usage log. Using this usage log, a given log entry that has been accessed a threshold number of times may be analyzed. Other log entries may be identified by matching log entries with similar trace signatures. Access data for these other log entries may illuminate a pattern among various log entries. Such patterns are identified and recorded. The recorded patterns may then be used to update a set of retention maps. The retention maps may associate a baseline retention value to ones of the plurality of topics.

Computing the log retention value may include, at 1340, generating the log retention value based on mapping log retention estimates to the categorized information and the one or more patterns. For example, a particular retention map may be used to assign a baseline retention value to a log entry that corresponds to a topic associated with the particular retention map. By updating the retention maps using access data from the usage log, the retention maps may be kept abreast of topics that are of current interest to users who are submitting queries. Accordingly, log entries associated with topics of current interest may then be given higher retention values than log entries not associated with topics of interest.

At 1350, method 1300 continues by retaining the log entry within a log file according to a retention period that corresponds to the log retention value. Log entries with high log retention values may be assigned retention periods that are longer than average. Conversely, log entries with low log retention values may be assigned shorter than average retention periods. Accordingly, the log entries associated with topics of current interest may be preserved for longer amounts of time than log entries that are not related to topics of interest.

Method 1300, it is noted, includes elements 1310-1350. As described for the other methods disclosed herein, method 1300 may end in 1350 or may repeat some or all elements. For example, method 1300 may repeat element 1330 to identify a plurality of patterns. It is noted that the methods presented above are merely examples. Variations of the disclosed methods are contemplated. One or more of the presented methods 800-1300 may be performed concurrently with other methods. In some embodiments, various combinations of different methods may be combined into a single method.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various operations that are performed in the context of instructions executed by one or more computer systems. For example, methods 800-1300 are described as, in some embodiments, being performed by any of computer systems 101, 401, and 601 as shown in various ones of FIGS. 1-7. In addition, various processes (e.g., 112 in FIG. 1) are described as being performed by computer systems in a computer network (e.g., computer network 100 in FIGS. 1 and 3). Computer network 100 may include any suitable number of server computer systems included, for example, in one or more data centers (physical facilities that store data that drives enterprise computing applications and provides online services to users via, e.g., the Internet). These components, therefore, are implemented on physical structures (i.e., on computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processor circuits or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—

[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   generating, by a computer system within a computer network, a log entry in response to detection of a respective triggering event, wherein the triggering event results in a set of processes being performed within the computer network;
   determining, by the computer system, a trace signature for the log entry, wherein the trace signature tracks information related to the set of processes;
   computing, by the computer system using the trace signature, a log retention value for the log entry, wherein the log retention value is computed using weight factors for ones of the set of processes; and
   retaining, by the computer system, the log entry within a log file according to a retention period that corresponds to the log retention value.

2. The method of claim 1, further comprising modifying, by the computer system, the retention period for the log entry based on a frequency of access to the log entry.

3. The method of claim 1, further comprising modifying, by the computer system, the weight factors based on a frequency of access to the log entry.

4. The method of claim 3, further comprising recalculating, by the computer system after modifying the weight factors, retention periods for different log entries currently stored within the log file.

5. The method of claim 1, wherein computing the log retention value further includes adjusting the log retention value based on an order of occurrence of the set of processes.

6. The method of claim 1, further comprising:
   prior to retaining the log entry within the log file, caching, by the computer system, the log entry for a particular amount of time, wherein the cached log entry includes a plurality of metrics associated with the log entry; and
   based on a current security threat level, determining, by the computer system at an end of the particular amount of time, whether to reduce a number of the plurality of metrics retained with the log entry when storing the log entry to the log file.

7. The method of claim 1, further comprising, after the retention period has ended, aggregating the log entry with one or more different log entries based on a determined similarity of respective trace signatures.

8. The method of claim 7, wherein aggregating the log entry includes using a graph convolutional network (GCN) to store, within nodes of the GCN, a subset of a plurality of metrics associated with the log entry.

9. The method of claim 8, further comprising in response to a received query, reconstructing the log entry with the plurality of metrics using a simulator to predict metrics not included in the subset.

10. The method of claim 1, wherein computing the log retention value for the log entry includes:
    using natural language programming to categorize the information included in the trace signature; and
    generating the log retention value based on mapping log retention estimates to the categorized information.

11. A computer-readable, non-transient memory including instructions that when executed by a computer system within a computer network, cause the computer system to perform operations including:
    receiving information associated with a triggering event that results in a set of processes being performed within the computer network;
    generating a log entry in response to detection of the triggering event;
    using the received information, computing a log retention value for the log entry using weight factors for ones of the set of processes; and
    storing the log entry within a log file according to a retention period corresponding to the log retention value; and
    modifying, by the computer system, the retention period for the log entry based on a frequency of access to the log entry.

12. The computer-readable medium of claim 11, wherein computing the log retention value includes determining a trace signature for the log entry, wherein the trace signature tracks information related to the set of processes.

13. The computer-readable medium of claim 11, further comprising modifying one or more of the weight factors based on the frequency of access to the log entry.

14. The computer-readable medium of claim 11, wherein storing the log entry within the log file includes storing a subset of the received information in the log entry, wherein the information included in the subset is determined based on the log retention value.

15. The computer-readable medium of claim 11, wherein computing the log retention value includes:
    using natural language programming to categorize the received information; and
    generating the log retention value based on mapping log retention estimates to the categorized information.

16. A system comprising:
    a processor circuit; and
    a memory circuit including instructions that when executed by processor circuit, cause the system to perform operations including:

receiving raw log data that includes information associated with a triggering event that results in a set of processes being performed within a computer network;

caching the raw log data for a particular amount of time;

at an end of the particular amount of time, generating a log entry using the raw log data, wherein a subset of the information from the raw log data is included in the log entry based on a current security threat level;

based on the information included in the log entry, computing a log retention value for the log entry using weight factors for ones of the set of processes; and storing the log entry within a log file according to a retention period corresponding to the log retention value.

17. The system of claim 16, wherein the operations further include:

comparing the set of processes associated with the log entry to respective sets of processes associated with different log entries; and determining one or more patterns based on the comparing.

18. The system of claim 17, wherein the operations further include modifying the weight factors using the one or more determined patterns.

19. The system of claim 16, wherein generating the log entry includes using a graph convolutional network (GCN) to:

map the subset of the information to nodes of the GCN; and determine links between ones of the nodes of the GCN based on the information mapped to the ones of the nodes.

20. The system of claim 19, wherein the operations further include identifying sub-graphs of the GCN based on the determined links.

* * * * *